United States Patent
Oka

(10) Patent No.: US 12,049,932 B2
(45) Date of Patent: Jul. 30, 2024

(54) PLANAR RATCHET ASSEMBLY FOR HUMAN-POWERED VEHICLE

(71) Applicant: Shimano Inc., Osaka (JP)

(72) Inventor: Tomonari Oka, Osaka (JP)

(73) Assignee: Shimano Inc., Osaka (JP)

( * ) Notice: Subject to any disclaimer, the term of this patent is extended or adjusted under 35 U.S.C. 154(b) by 714 days.

(21) Appl. No.: 17/141,567

(22) Filed: Jan. 5, 2021

(65) Prior Publication Data

US 2022/0213939 A1 Jul. 7, 2022

(51) Int. Cl.
| | | |
|---|---|---|
| *F16D 41/32* | (2006.01) | |
| *B60B 27/00* | (2006.01) | |
| *B60B 27/02* | (2006.01) | |
| *B60B 27/04* | (2006.01) | |

(52) U.S. Cl.
CPC ............ *F16D 41/32* (2013.01); *B60B 27/023* (2013.01); *B60B 27/047* (2013.01); *B60B 27/0005* (2013.01); *B60B 2200/47* (2013.01); *B60B 2360/104* (2013.01); *B60B 2900/1212* (2013.01); *B60B 2900/133* (2013.01); *B60B 2900/212* (2013.01); *B60B 2900/321* (2013.01)

(58) Field of Classification Search
CPC ....... F16D 11/14; F16D 41/32; B60B 27/023; B60B 27/047; B60B 2200/47; B60B 2900/1212; B60B 2900/133
See application file for complete search history.

(56) References Cited

U.S. PATENT DOCUMENTS

| | | | | |
|---|---|---|---|---|
| 2,398,570 A | * | 4/1946 | Wildhaber | ............. F16D 11/14 |
| | | | | 403/364 |
| 5,964,332 A | * | 10/1999 | King | ........................ B62M 9/10 |
| | | | | 192/64 |
| 6,202,813 B1 | | 3/2001 | Yahata et al. | |

(Continued)

FOREIGN PATENT DOCUMENTS

| | | |
|---|---|---|
| AT | 331646 B | 8/1976 |
| DE | 68902322 T2 | 1/1993 |

(Continued)

OTHER PUBLICATIONS

Translation of DE 102010033454 A1, 7 pages (Year: 2012).*

*Primary Examiner* — S. Joseph Morano
*Assistant Examiner* — Emily G. Castonguay
(74) *Attorney, Agent, or Firm* — Global IP Counselors, LLP

(57) ABSTRACT

A planar ratchet assembly is provided for a human-powered vehicle, and includes a first ratchet member and a second ratchet member. The first ratchet member includes an axial surface defining a plurality of first serrated teeth having a first driving surface and a first non-driving surface. At least one of the first non-driving surfaces includes a convex curved surface that has a radius of curvature of at least 0.5 mm. The second ratchet member includes an axial surface defining a plurality of second serrated teeth having a second driving surface and a second non-driving surface. The first ratchet member and the second ratchet member rotate together in a driving direction. At least one of the first ratchet member and the second ratchet member moves in an axial direction to permit relative rotation between the first ratchet member and the second ratchet member in a non-driving direction.

32 Claims, 14 Drawing Sheets

(56) References Cited

U.S. PATENT DOCUMENTS

| | | | |
|---|---|---|---|
| 6,588,564 B1 * | 7/2003 | Jager | B60B 27/047 |
| | | | 192/64 |
| 7,938,242 B2 | 5/2011 | Chen | |
| 9,132,883 B2 | 9/2015 | Bettin | |
| 9,199,509 B2 | 12/2015 | Koshiyama | |
| 9,669,656 B2 | 6/2017 | Lim et al. | |
| 9,707,801 B2 | 7/2017 | Fujita et al. | |
| 10,780,737 B2 | 9/2020 | Nakajima et al. | |
| 2002/0072446 A1 * | 6/2002 | Kanehisa | B60B 27/0078 |
| | | | 192/64 |
| 2010/0170762 A1 * | 7/2010 | Schlanger | F16D 41/36 |
| | | | 192/46 |
| 2012/0032498 A1 * | 2/2012 | Klieber | B60B 27/047 |
| | | | 192/64 |
| 2012/0318629 A1 * | 12/2012 | Lyman | F16D 11/14 |
| | | | 192/69.7 |
| 2014/0110208 A1 * | 4/2014 | Braedt | B60B 27/023 |
| | | | 192/46 |
| 2017/0015137 A1 * | 1/2017 | Braedt | F16D 41/24 |

FOREIGN PATENT DOCUMENTS

| | | | | |
|---|---|---|---|---|
| DE | 10 2010 033 268 A1 | 2/2012 | | |
| DE | 102010033454 A1 * | 2/2012 | | B60B 27/0047 |
| DE | 10 2016 111 942 A1 | 1/2018 | | |
| WO | 00/21762 A1 | 4/2000 | | |

* cited by examiner

PLANAR RATCHET ASSEMBLY FOR HUMAN-POWERED VEHICLE

BACKGROUND

Technical Field

This disclosure generally relates to a planar ratchet assembly for a human-powered vehicle.

Background Information

Generally, bicycle wheels have a hub, a plurality of spokes and an annular rim. The hub has a hub axle that is non-rotatably mounted to a frame of the bicycle. The hub has a hub shell that is coaxially coupled to the hub axle so that the hub shell is disposed radially outwardly with respect to the hub axle. The bearings are configured and arranged to support the hub shell so that the hub shell can freely rotate around the hub axle. In almost all types of bicycles except fixed gear and track racers, a wheel of the bicycle, typically the rear wheel, is provided with a bicycle freewheel that is arranged on a hub of the wheel. The bicycle freewheel usually has a one-way clutch function whereby it only transfers torque in one direction. Thus, freewheels are used so that the bicycle can advance freely without any rotation of the pedals (i.e., during coasting). During coasting, the bicycle freewheel is considered to be in a state of freewheeling in which the bicycle wheel can freely rotate while the sprockets remain stationary.

SUMMARY

Generally, the present disclosure is directed to various features of a planar ratchet assembly for a human-powered vehicle. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a planar ratchet assembly is provided for a human-powered vehicle. The planar ratchet assembly basically comprises a first ratchet member and a second ratchet member. The first ratchet member includes a first axial surface defining a plurality of first serrated teeth. The first serrated teeth has a first driving surface, a first non-driving surface and a first tooth tip. The first tooth tips connect corresponding ones of the first driving surfaces and the first non-driving surfaces. At least one of the first non-driving surfaces includes a first convex curved surface that has a first radius of curvature of at least 0.5 mm. The second ratchet member includes a second axial surface defining a plurality of second serrated teeth. The second serrated teeth has a second driving surface, a second non-driving surface and a second tooth tip. The second tooth tips connects corresponding ones of the second driving surfaces and the second non-driving surfaces. The first ratchet member and the second ratchet member are configured to rotate together about a rotational axis in a driving direction where the first driving surfaces contact the second driving surfaces. At least one of the first ratchet member and the second ratchet member is movable in an axial direction of the rotational axis to permit relative rotation between the first ratchet member and the second ratchet member about the rotational axis in a non-driving direction where the first non-driving surfaces and the second non-driving surfaces slidably contact each other.

With the planar ratchet assembly according to the first aspect, it is possible to suppress the noise that the non-driving surfaces hit each other when the first non-driving surfaces and the second non-driving surfaces slidably contact each other.

In accordance with a second aspect of the present disclosure, the planar ratchet assembly according to the first aspect is configured so that the first radius of curvature is at least 1.0 mm.

With the planar ratchet assembly according to the second aspect, it is possible to further suppress the noise that the non-driving surfaces hit each other when the first non-driving surfaces and the second non-driving surfaces slidably contact each other.

In accordance with a third aspect of the present disclosure, the planar ratchet assembly according to the second aspect is configured so that the first radius of curvature is at least 1.5 mm.

With the planar ratchet assembly according to the third aspect, it is possible to even further suppress the noise that the non-driving surfaces hit each other when the first non-driving surfaces and the second non-driving surfaces slidably contact each other.

In accordance with a fourth aspect of the present disclosure, the planar ratchet assembly according to any one of the first to third aspects is configured so that the at least one of the first non-driving surfaces further include a first planar surface.

With the planar ratchet assembly according to the fourth aspect, it is possible to ensure smooth sliding along the at least one of the first non-driving surfaces.

In accordance with a fifth aspect of the present disclosure, the planar ratchet assembly according to any one of the first to fourth aspects is configured so that the at least one the first non-driving surfaces further include a first concave curved surface.

With the planar ratchet assembly according to the fifth aspect, it is possible to ensure smooth sliding along the at least one of the first non-driving surfaces.

In accordance with a sixth aspect of the present disclosure, the planar ratchet assembly according to the fifth aspect is configured so that the first convex curved surface is located between the first tooth tip and the first concave curved surface of the at least one the first non-driving surfaces.

With the planar ratchet assembly according to the sixth aspect, it is possible to minimize contact of the first tooth tip by the second non-driving surfaces.

In accordance with a seventh aspect of the present disclosure, the planar ratchet assembly according to the fifth aspect is configured so that the at least one of the first non-driving surfaces further include a first planar surface connecting the first convex curved surface and the first concave curved surface.

With the planar ratchet assembly according to the seventh aspect, it is possible to ensure smooth sliding along the at least one of the first non-driving surfaces.

In accordance with an eighth aspect of the present disclosure, the planar ratchet assembly according to the fifth aspect is configured so that the first convex curved surface and the first concave curved surface for the at least one of the first non-driving surfaces are continuous without a planar surface therebetween.

With the planar ratchet assembly according to the eighth aspect, it is possible to ensure smooth sliding along the at least one of the first non-driving surfaces.

In accordance with a ninth aspect of the present disclosure, the planar ratchet assembly according to any one of the first to eighth aspects is configured so that the at least one of the first non-driving surfaces has a first tilt angle with respect to a plane perpendicular to the rotational axis that is greater than zero degrees and that is twenty-five degrees or less.

With the planar ratchet assembly according to the ninth aspect, it is possible to reduce the force of the non-driving surfaces hitting each other since the non-driving surfaces slide easily. Therefore, the impact when the non-driving surfaces hit each other can be reduced and the noise generated can be reduced.

In accordance with a tenth aspect of the present disclosure, the planar ratchet assembly according to the eighth aspect is configured so that the first tilt angles are twenty degrees or less.

With the planar ratchet assembly according to the tenth aspect, it is possible to further reduce the impact and reduce the noise generated when the non-driving surfaces hit each other.

In accordance with an eleventh aspect of the present disclosure, the planar ratchet assembly according to the eighth aspect is configured so that the first tilt angles are sixteen degrees or less.

With the planar ratchet assembly according to the eleventh aspect, it is possible to even further reduce the impact and reduce the noise generated when the non-driving surfaces hit each other.

In accordance with a twelfth aspect of the present disclosure, the planar ratchet assembly according to any one of the first to eleventh aspects is configured so that at least one of the first tooth tips includes a first flat surface.

With the planar ratchet assembly according to the twelfth aspect, it is possible to improve a shearing force of the at least one of the first tooth tips.

In accordance with a thirteenth aspect of the present disclosure, the planar ratchet assembly according to any one of the first to twelfth aspects is configured so that the first ratchet member further includes a first root surface between adjacent ones of the first serrated teeth.

With the planar ratchet assembly according to the thirteenth aspect, it is possible to avoid contact of the non-driving surfaces at the tooth tips of the teeth to minimize damage to the tooth tips where the planar ratchet assembly is rotating at a very high speed.

In accordance with a fourteenth aspect of the present disclosure, the planar ratchet assembly according to the thirteenth aspect is configured so that the second ratchet member further includes a second root surface between adjacent ones of the second serrated teeth, and at least one of the first tooth tips is spaced from the second root surfaces where the first driving surfaces are engaged with the second driving surfaces.

With the planar ratchet assembly according to the fourteenth aspect, it is possible to avoid contact the tooth tips of the teeth from contacting the mating ratchet to minimize damage to the tooth tips.

In accordance with a fifteenth aspect of the present disclosure, the planar ratchet assembly according to any one of the first to fourteenth aspects is configured so that the first serrated teeth include an outer surface having an aluminum alloy.

With the planar ratchet assembly according to the fifteenth aspect, it is possible to the impact when the non-driving surfaces hit each other can be reduced by using a soft material such as an aluminum alloy.

In accordance with a sixteenth aspect of the present disclosure, the planar ratchet assembly according to any one of the first to fifteenth aspects is configured so that at least one of the second non-driving surfaces including a second convex curved surface that has a second radius of curvature of at least 0.5 mm.

With the planar ratchet assembly according to the sixteenth aspect, it is possible to further suppress the noise that the non-driving surfaces hit each other when the first non-driving surfaces and the second non-driving surfaces slidably contact each other.

In accordance with a seventeenth aspect of the present disclosure, the planar ratchet assembly according to the sixteenth aspect is configured so that the second radius of curvature is at least 1.0 mm.

With the planar ratchet assembly according to the seventeenth aspect, it is possible to even further suppress the noise that the non-driving surfaces hit each other when the first non-driving surfaces and the second non-driving surfaces slidably contact each other.

In accordance with an eighteenth aspect of the present disclosure, the planar ratchet assembly according to the seventeenth aspect is configured so that the second radius of curvature is at least 1.5 mm.

With the planar ratchet assembly according to the eighteenth aspect, it is possible to even further suppress the noise that the non-driving surfaces hit each other when the first non-driving surfaces and the second non-driving surfaces slidably contact each other.

In accordance with a nineteenth aspect of the present disclosure, the planar ratchet assembly according to the sixteenth aspect is configured so that the at least one of the second non-driving surfaces further includes a second planar surface.

With the planar ratchet assembly according to the nineteenth aspect, it is possible to ensure smooth sliding along the at least one of the second non-driving surfaces.

In accordance with a twentieth aspect of the present disclosure, the planar ratchet assembly according to the sixteenth aspect is configured so that the at least one of the second non-driving surfaces further includes a second concave curved surface.

With the planar ratchet assembly according to the twentieth aspect, is possible to ensure smooth sliding along the at least one of the second non-driving surfaces.

In accordance with a twenty-first aspect of the present disclosure, the planar ratchet assembly according to the twentieth aspect is configured so that the second curved convex surface is located between the second tooth tip and the second concave curved surface of the at least one the second non-driving surfaces.

With the planar ratchet assembly according to the twenty-first aspect, it is possible to minimize contact of the second tooth tip by the first non-driving surfaces.

In accordance with a twenty-second aspect of the present disclosure, the planar ratchet assembly according to the twentieth aspect is configured so that the at least one of the second non-driving surfaces further includes a second planar surface connecting the second convex curved surface and the second concave curved surface.

With the planar ratchet assembly according to the twenty-second aspect, it is possible to ensure smooth sliding along the at least one of the second non-driving surfaces.

In accordance with a twenty-third aspect of the present disclosure, the planar ratchet assembly according to the twentieth aspect is configured so that the second convex curved surface and the second concave curved surface for the at least one of the second non-driving surfaces are continuous without a planar surface therebetween.

With the planar ratchet assembly according to the twenty-third aspect, it is possible to ensure smooth sliding along the at least one of the second non-driving surfaces.

In accordance with a twenty-fourth aspect of the present disclosure, the planar ratchet assembly according to the sixteenth aspect is configured so that the at least one of the second non-driving surfaces has a second tilt angle with respect to a plane perpendicular to the rotational axis that is greater than zero degrees and that is twenty-five degrees or less.

With the planar ratchet assembly according to the twenty-fourth aspect, it is possible to reduce the force of the non-driving surfaces hitting each other since the non-driving surfaces slide easily. Therefore, the impact when the non-driving surfaces hit each other can be reduced and the noise generated can be reduced.

In accordance with a twenty-fifth aspect of the present disclosure, the planar ratchet assembly according to the twenty-fourth aspect is configured so that the second tilt angles are twenty degrees or less.

With the planar ratchet assembly according to the twenty-fifth aspect, it is possible to further reduce the impact and reduce the noise generated when the non-driving surfaces hit each other.

In accordance with a twenty-sixth aspect of the present disclosure, the planar ratchet assembly according to the twenty-fourth aspect is configured so that the second tilt angles are sixteen degrees or less.

With the planar ratchet assembly according to the twenty-sixth aspect, it is possible to even further reduce the impact and reduce the noise generated when the non-driving surfaces hit each other.

In accordance with a twenty-seventh aspect of the present disclosure, the planar ratchet assembly according to the sixteenth aspect is configured so that at least one of the second tooth tips includes a second flat surface.

With the planar ratchet assembly according to the twenty-seventh aspect, it is possible to improve a shearing force of the at least one of the second tooth tips.

In accordance with a twenty-eighth aspect of the present disclosure, the planar ratchet assembly according to the sixteenth aspect is configured so that the second ratchet member further includes a second root surface between adjacent ones of the second serrated teeth.

With the planar ratchet assembly according to the twenty-eighth aspect, it is possible to avoid contact of the non-driving surfaces at the tooth tips of the teeth to minimize damage to the tooth tips where the planar ratchet assembly is rotating at a very high speed.

In accordance with a twenty-ninth aspect of the present disclosure, the planar ratchet assembly according to the twenty-eighth aspect is configured so that the first ratchet member further includes a first root surface between adjacent ones of the first serrated teeth, and at least one of the second tooth tips is spaced from the first root surfaces where the first driving surfaces are engaged with the second driving surfaces.

With the planar ratchet assembly according to the twenty-ninth aspect, it is possible to avoid contact the tooth tips of the teeth from contacting the mating ratchet to minimize damage to the tooth tips.

In accordance with a thirtieth aspect of the present disclosure, the planar ratchet assembly according to the sixteenth aspect is configured so that the second serrated teeth include an outer surface having an aluminum alloy.

With the planar ratchet assembly according to the thirtieth aspect, it is possible to the impact when the non-driving surfaces hit each other can be reduced by using a soft material such as an aluminum alloy.

In accordance with a thirty-first aspect of the present disclosure, the planar ratchet assembly according to any one of the first to thirtieth aspects is configured so that the first ratchet member has a total number of the first serrated teeth arranged in a first ring having a first outer ratchet diameter such that a first ratio of the total number of the first serrated teeth divided by the first outer ratchet diameter is 0.7 or more.

With the planar ratchet assembly according to the thirty-first aspect, it is possible to reduce noise generated by the non-driving surfaces of the serrated teeth hitting each other because the number of sounds generated is reduced.

In accordance with a thirty-second aspect of the present disclosure, the planar ratchet assembly according to the thirty-first aspect is configured so that the first ratio is 1.5 or less.

With the planar ratchet assembly according to the thirty-second aspect, it is possible to further reduce noise generated by the non-driving surfaces of the serrated teeth hitting each other because the number of sounds generated is reduced.

In accordance with a thirty-third aspect of the present disclosure, a hub comprises the planar ratchet assembly according to any one of the first to thirty-second aspects, and further comprises a hub axle, a hub body and a sprocket support. The hub axle defines the rotational axis. The hub body is rotatably disposed around the hub axle. The sprocket support is rotatably coupled to the hub axle via the planar ratchet assembly to transmit a driving force from the sprocket support to the hub body while the sprocket support rotates in the driving direction.

With the hub according to the thirty-third aspect, it is possible to provide a hub in which the noise that is generated by the non-driving surfaces hitting each other is suppress when the first non-driving surfaces and the second non-driving surfaces slidably contact each other during coasting.

Also, other objects, features, aspects and advantages of the disclosed planar ratchet assembly will become apparent to those skilled in the art from the following detailed description, which, taken in conjunction with the annexed drawings, discloses preferred embodiments of the planar ratchet assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
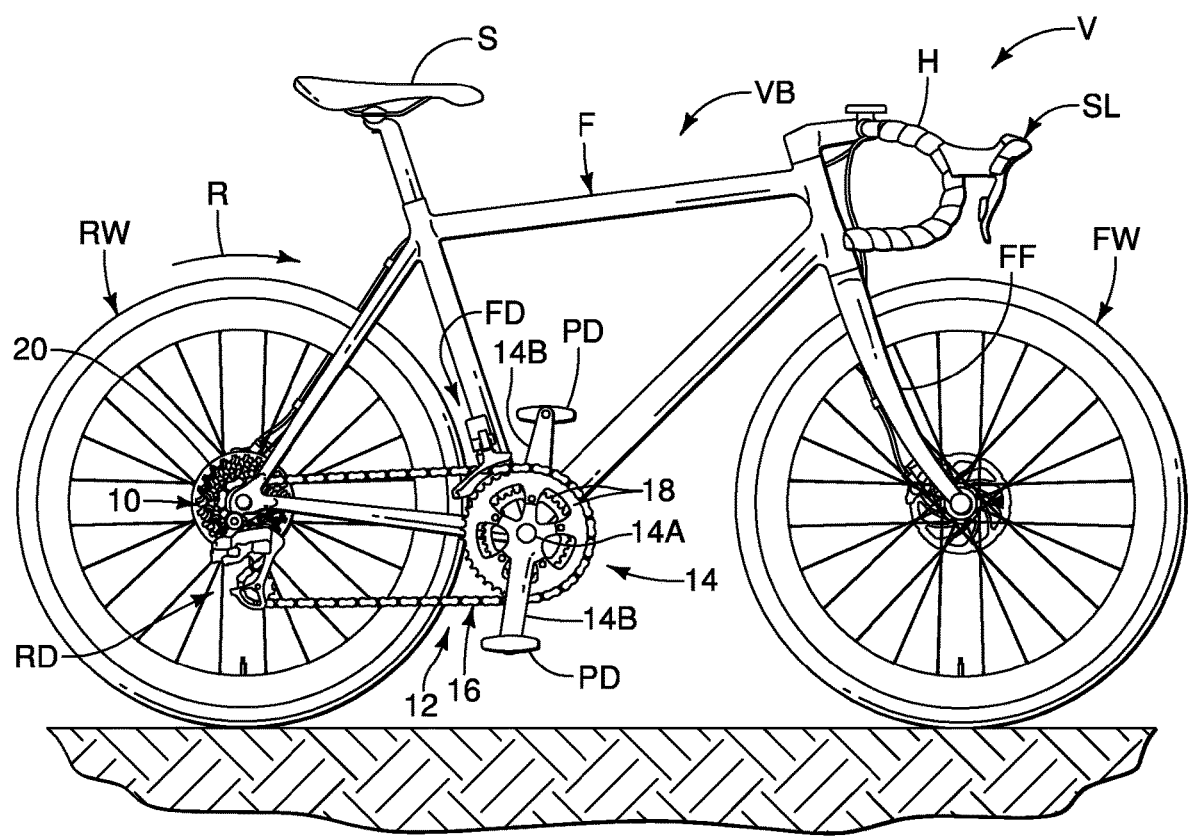
FIG. 1 is a side elevational view of a human-powered vehicle (e.g., a bicycle) equipped with a rear wheel having a hub having a planar ratchet assembly in accordance with one embodiment.

Referring initially to FIG. 1, a human-powered vehicle V is illustrated that is equipped with a hub 10 in accordance with one illustrated embodiment. In this embodiment, the human-powered vehicle V is a bicycle and the hub 10 is a bicycle hub. The human-powered vehicle V includes a front wheel FW and a rear wheel RW rotatably attached to a vehicle body VB. Here, the hub 10 is provided to the rear wheel RW. The vehicle body VB is also provided with a handlebar H and a front fork FF for steering the front wheel FW. The vehicle body VB is also provided with a saddle S for a rider to sit on while riding the human-powered vehicle V.

As seen in FIG. 1, the human-powered vehicle V further comprises a drive assembly 12. The drive assembly 12 comprises the hub 10. Here, for example, the drive assembly 12 is a chain-drive type. The drive assembly 12 further comprises a crank 14, a chain 16 (i.e., a force transmission member), a plurality of front sprockets 18 (i.e., a front rotatable body) and plurality of rear sprockets 20 (i.e., a rear rotatable body). The chain 16 provides mechanical communication between the crank 14 and the hub 10. Thus, a rotational force caused by rotation of the crank 14 in a forward traveling direction R can be transmitted to the hub 10 via the chain 16. The crank 14 includes a crank axle 14A and a pair of crank arms 14B. A pedal PD is rotatably coupled to the distal end of each of the crank arms 14B. The crank arms 14B are provided on opposite ends of the crank axle 14A. The chain 16 can provide a mechanical connection between the front sprockets 18 and the rear sprockets 20 provided on the hub 10.

Here, the human-powered vehicle V further includes a front derailleur FD that is attached to the vehicle body VB for shifting the chain 16 between the sprockets 18 that are provided to the crank 14. Also, here, the human-powered vehicle V further includes a rear derailleur RD that is attached to the rear of the vehicle body VB for shifting the chain 16 between the rear sprockets 20 that are provided to the hub 10. The front derailleur FD and the rear derailleur RD are one type of gear changing device. Here, for example, the front derailleur FD and the rear derailleur RD are electric derailleurs (i.e., electric gear changing devices). The front derailleur FD and the rear derailleur RD are operated when a rider of the human-powered vehicle V manually operates a gear shift operating device or shifter SL. The front derailleur FD and the rear derailleur RD can also be automatically operated based on traveling conditions and/or operating conditions of the human-powered vehicle V.

The structure of the hub 10 will now be described with particular reference to FIGS. 2 to 4. The hub 10 basically comprises a hub axle 30, a hub body 32 and a sprocket support 34. The hub axle 30 defines the rotational axis CA. The hub body 32 is rotatably disposed around the hub axle 30. The sprocket support 34 is rotatably coupled to the hub axle 30 to transmit a driving force from the sprocket support 34 to the hub body 32 while the sprocket support 34 rotates in a driving direction D1 as explained later. Basically, the hub axle 30 is non-rotatably attached to the vehicle body VB, and the hub body 32 is rotatably mounted around the hub axle 30. As indicated in FIG. 1, the hub body 32 rotates relative to the hub axle 30 in a driving direction D1 which corresponds to a forward traveling direction R of the rear wheel RW. The sprocket support 34 is configured to support the rear sprockets 22.

Here, the hub axle 30 is a conventional member having a shaft portion 30a with a first end cap 30b screwed on a first threaded end of the hub axle 30 and a second end cap 30c screwed on a second threaded end of the hub axle 30. The hub axle 30 defines a rotational axis CA. The hub body 32 is rotatably mounted on the hub axle 30 to rotate around the rotational axis CA. The hub body 32 has a center tubular body 32a and a pair of spoke attachment flanges 32b and 32c extending outwardly in a radial direction from the center tubular body 32a.

Figure 2:
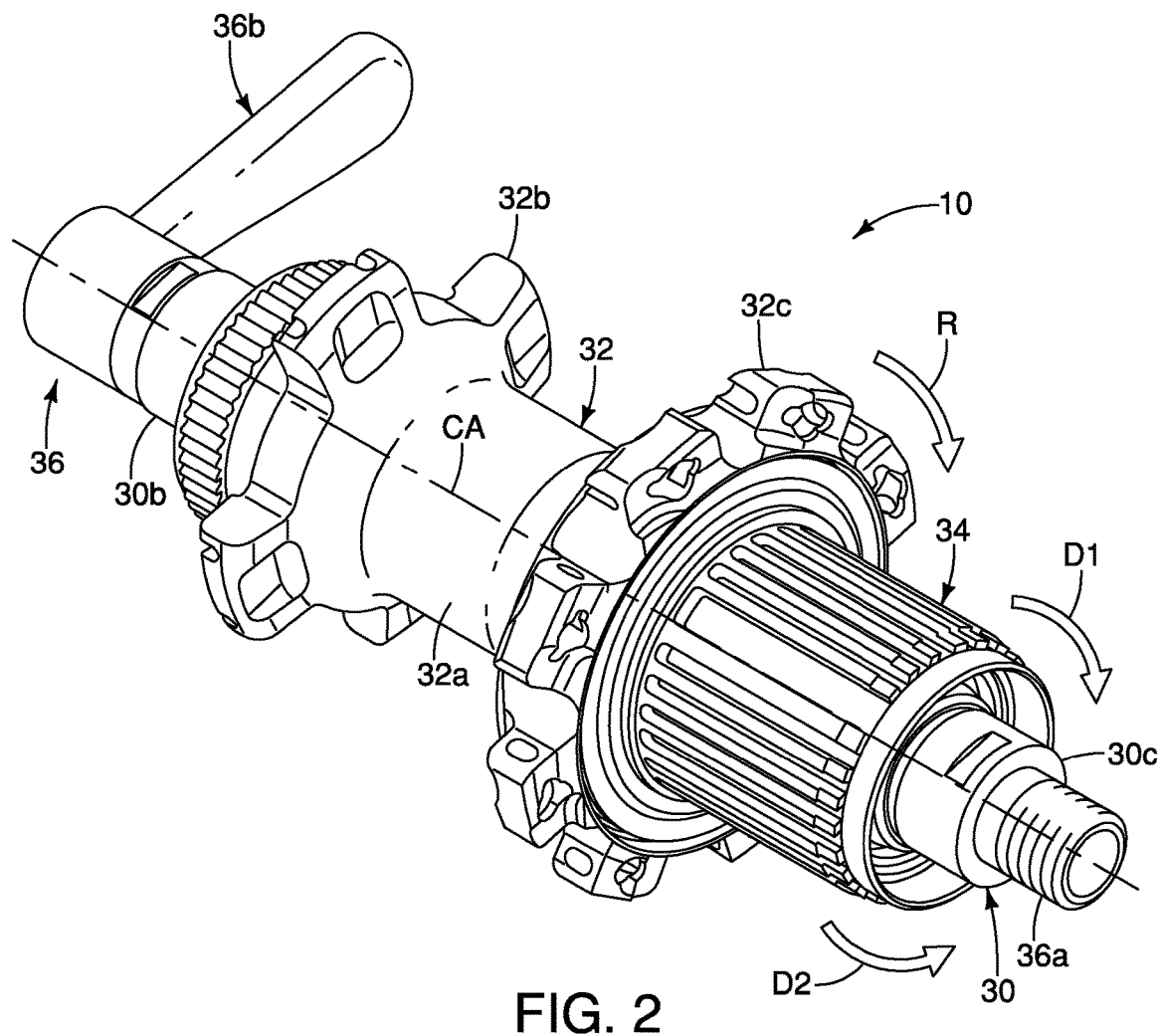
FIG. 2 is a perspective view of the hub of the rear wheel of the human-powered vehicle illustrated in FIG. 1.

As shown in FIG. 2, a frame securing device 36 is provided for attaching the hub 10 to a bicycle frame F (See FIG. 1) in a conventional manner. In the first illustrated embodiment, the frame securing device 36 includes a skewer or spindle 36a that has a cam lever mechanism 36b mounted at one end of the spindle 36a. Thus, the hub 10 can be mounted onto a rear section of the vehicle body VB of the human-powered vehicle V as seen in FIG. 1.

Figure 3:
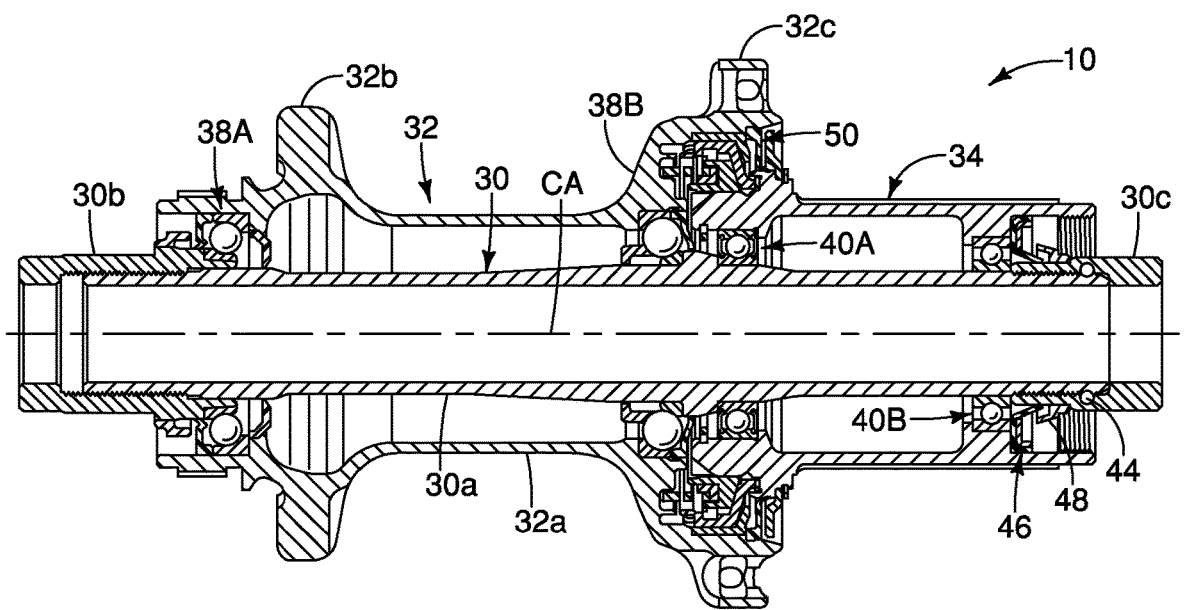
FIG. 3 is a longitudinal cross sectional view of the hub illustrated in FIG. 2 with the frame securing device omitted.

As shown in FIG. 3, the hub 10 further comprises at least one bearing assembly for rotatably supporting the hub body 32 on the hub axle 30. In the illustrated embodiment, the hub body 32 is rotatably mounted on the hub axle 30 by a pair of bearing assemblies 38A and 38B. The bearing assemblies 38A and 38B are conventional parts that are well known in the bicycle field, and thus, the bearing assemblies 38A and 38B will not be discussed any or illustrated in detail herein. Also, other bearing arrangements can be used as needed and/or desired.

Figure 6:
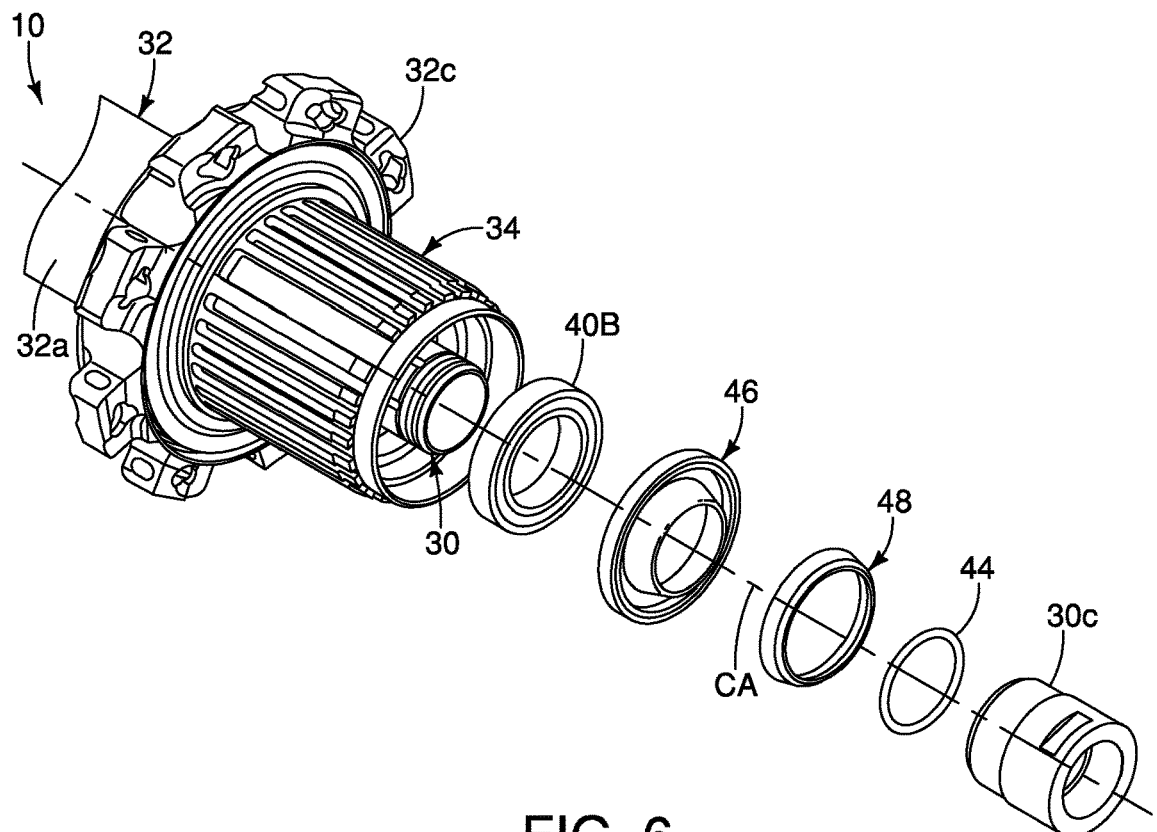
FIG. 6 is an exploded perspective view of selected parts of the freewheel of the hub illustrated in FIGS. 1 to 5.

Referring to FIGS. 3 and 6, the hub 10 further comprises at least one bearing assembly for rotatably supporting the sprocket support 34 on the hub axle 30. In the illustrated embodiment, the sprocket support 34 is rotatably coupled to the hub axle 30 by a pair of bearing assemblies 40A and 40B as seen in FIG. 3. The sprocket support 34 is axially retained on the hub axle 30 by the second end cap 30c. The second end cap 30c is screwed on the shaft portion 30a of the hub axle 30 to contact an inner race of the bearing assembly 40B. An O-ring 44 is provided between the second end cap 30c and the hub axle 30 for sealing the interface therebetween. Also, a first sealing ring 46 is provided to the interior of the sprocket support 34 and a second sealing ring 48 is provided to the exterior of the second end cap 30c for sealing the space between the interior of the sprocket support 34 and the exterior of the second end cap 30c.

Referring to FIGS. 3 to 7, a planar ratchet assembly 50 is provided for the human-powered vehicle V. More specifically, the hub 10 comprises the planar ratchet assembly 50. The planar ratchet assembly 50 is configured to transmit a driving force from the sprocket support 34 to the hub body 32 while the sprocket support 34 rotates in the driving direction D1. In other words, the sprocket support 34 is rotatably coupled to the hub axle 30 via the planar ratchet assembly 50 to transmit a driving force from the sprocket support 34 to the hub body 32 while the sprocket support 34 rotates in the driving direction D1.

The planar ratchet assembly 50 functions as a one-way clutch between the hub body 32 and the sprocket support 34 to permit coasting or freewheeling of the sprocket support 34 with respect to the hub body 32. In particular, coasting or freewheeling occurs when the sprocket support 34 is stopped from rotating in the driving direction D1 (i.e., clockwise about the rotational axis CA as viewed from the freewheel side of the hub 10) by a chain 16, while the hub body 32 rotates in the forward traveling direction R. Additionally, coasting or freewheeling occurs when the hub body 32 rotates faster in the forward traveling direction R than the sprocket support 34 rotates in the driving direction D1 by the chain 16. Also, coasting or freewheeling occurs when the sprocket support 34 rotates in a non-driving direction D2 by the chain 16 due to the rider pedaling backwards.

Basically, the planar ratchet assembly 50 comprises a first ratchet member 51 and a second ratchet member 52. The planar ratchet assembly 50 further comprises a biasing element 53. As shown in FIGS. 4 and 5, the biasing element 53 is disposed between the hub body 32 and the second ratchet member 52. The biasing element 53 biases the second ratchet member 52 in the axial direction A toward the first ratchet member 51 into the engagement position. Preferably, the biasing element 53 is configured to rotate with the hub body 32. In the illustrated embodiment, the biasing element 53 has a protrusion that is disposed in a recess of the hub body 32 so that the biasing element 53 rotates together with the hub body 32. With the sprocket support 34 in a rest position (i.e., no torque being applied thereto), the biasing element 53 maintains the second ratchet member 52 in driving engagement with the first ratchet member 51. The biasing element 53 includes, for example, a compression spring in the illustrated embodiment and the friction member 54. In other words, in the illustrated embodiment, the friction member 54 is provided as a separate piece that is fixed on the end of the compression spring of the biasing element 53 that faces the second ratchet member 52. Alternatively, the friction member 54 can be omitted such that an end coil of the biasing element 53 forms a friction member.

The first ratchet member 51 and the second ratchet member 52 move relative to each other in the axial direction as shown in FIG. 5. In particular, the second ratchet member 52 is biased in a first axial direction A1 towards the first ratchet member 51 into an engaged position by the biasing element 53 as seen in FIG. 4. During coasting, the sprocket support 34 stops rotating in the driving direction D1 and the hub body 32 continues to rotate in the forward traveling direction R. As a result of the sprocket support 34 stop rotating in the driving direction D1, the second ratchet member 52 is moved in the second axial direction A2 away from the first ratchet member 51 against the force of the biasing element 53. In this way, the first ratchet member 51 and the second ratchet member 52 can slide relative to each other as seen in FIG. 5.

Figure 4:
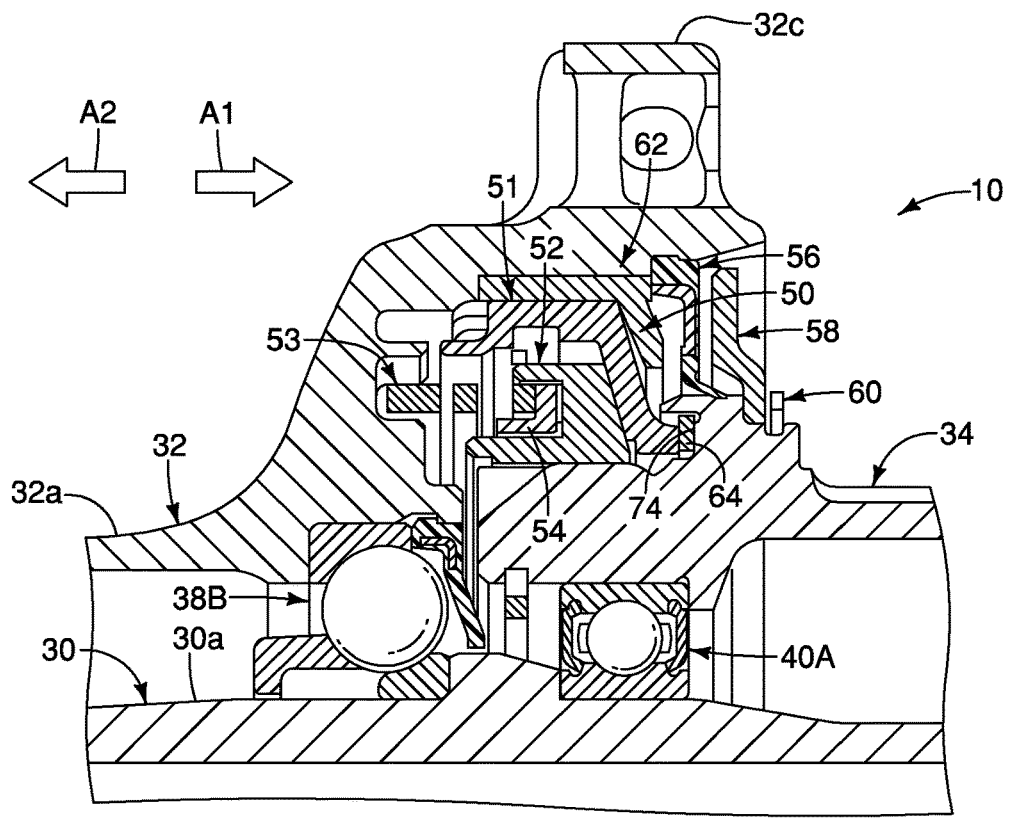
FIG. 4 is an enlarged cross sectional view of a portion of the hub illustrated in FIG. 3 showing the first ratchet member and the second ratchet member of the planar ratchet assembly in an engaged position for driving a hub body of the hub.
Figure 5:
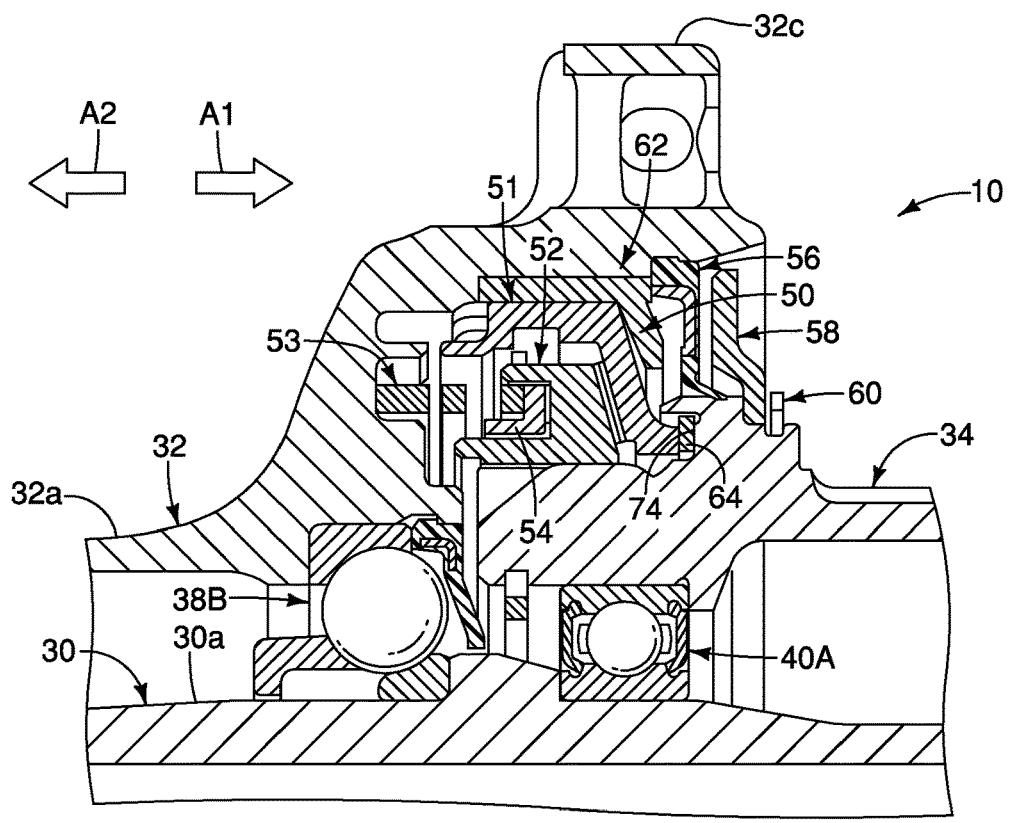
FIG. 5 is an enlarged cross sectional view of the portion of the hub illustrated in FIG. 4 showing the first ratchet member and the second ratchet member in a disengaged position for coasting.

As seen in FIGS. 4 and 5, a dust shield 56 is provided for covering annular gap between the sprocket support 34 and the hub body 32. A support retaining assembly retains the dust shield 56 to the hub body 32. The support retaining assembly includes an outer cap 58 and a retaining ring or clip 60. The outer cap 58 is disposed between the sprocket support 34 and the hub body 32. The retaining ring or clip 60 disposed in a recess in the sprocket support 34 to retain on the retaining ring 60 on the sprocket support 34 and to limit outward axial movement of the outer cap 58.

The hub 10 further includes a circumferential spacer 62 and an axial spacer 64. The circumferential spacer 62 is disposed between the hub body 32 and the first ratchet member 51 to take up the circumferential space between the first ratchet member 51 and the hub body 32. The axial spacer 64 is disposed between the sprocket support 34 and the first ratchet member 51 to take up the axial space between the sprocket support 34 and the first ratchet member 51.

Figure 7:
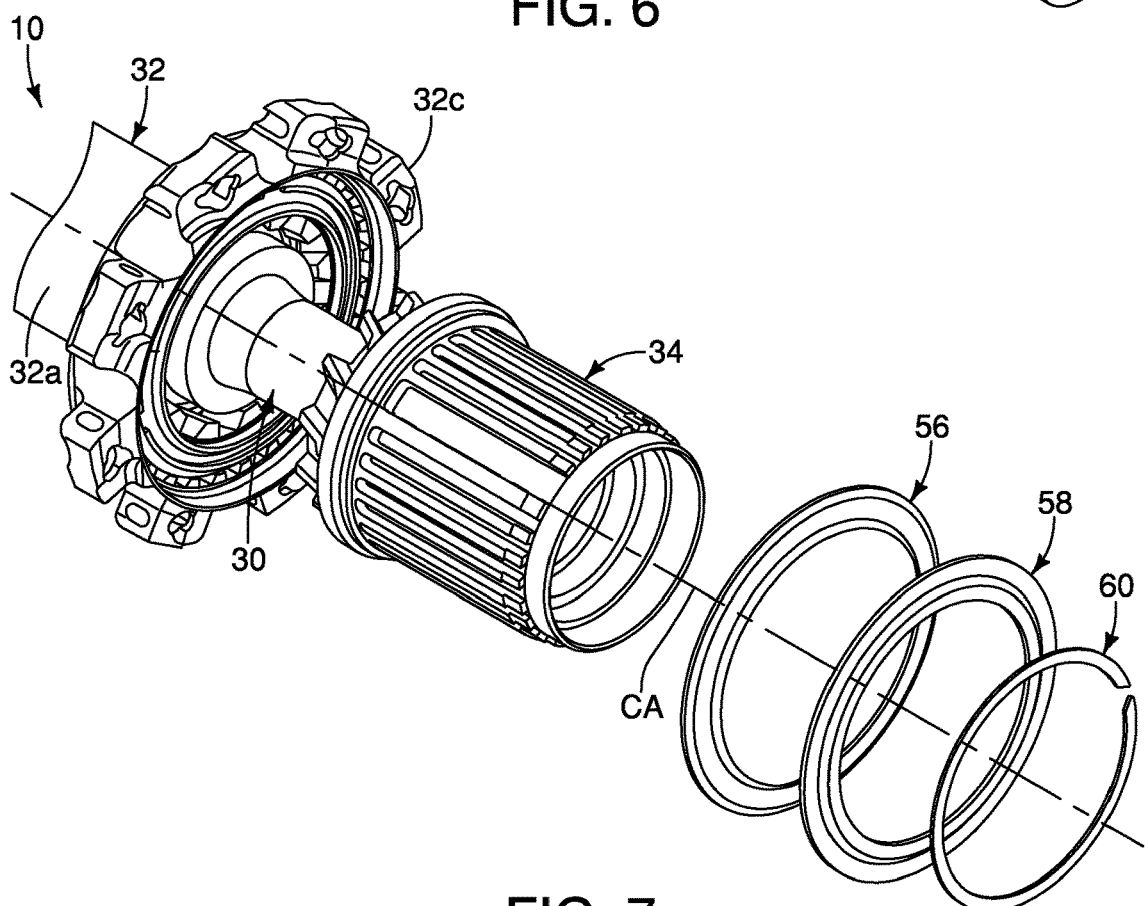
FIG. 7 is an exploded perspective view of other selected parts of the freewheel of the hub illustrated in FIGS. 1 to 5.
Figure 10:
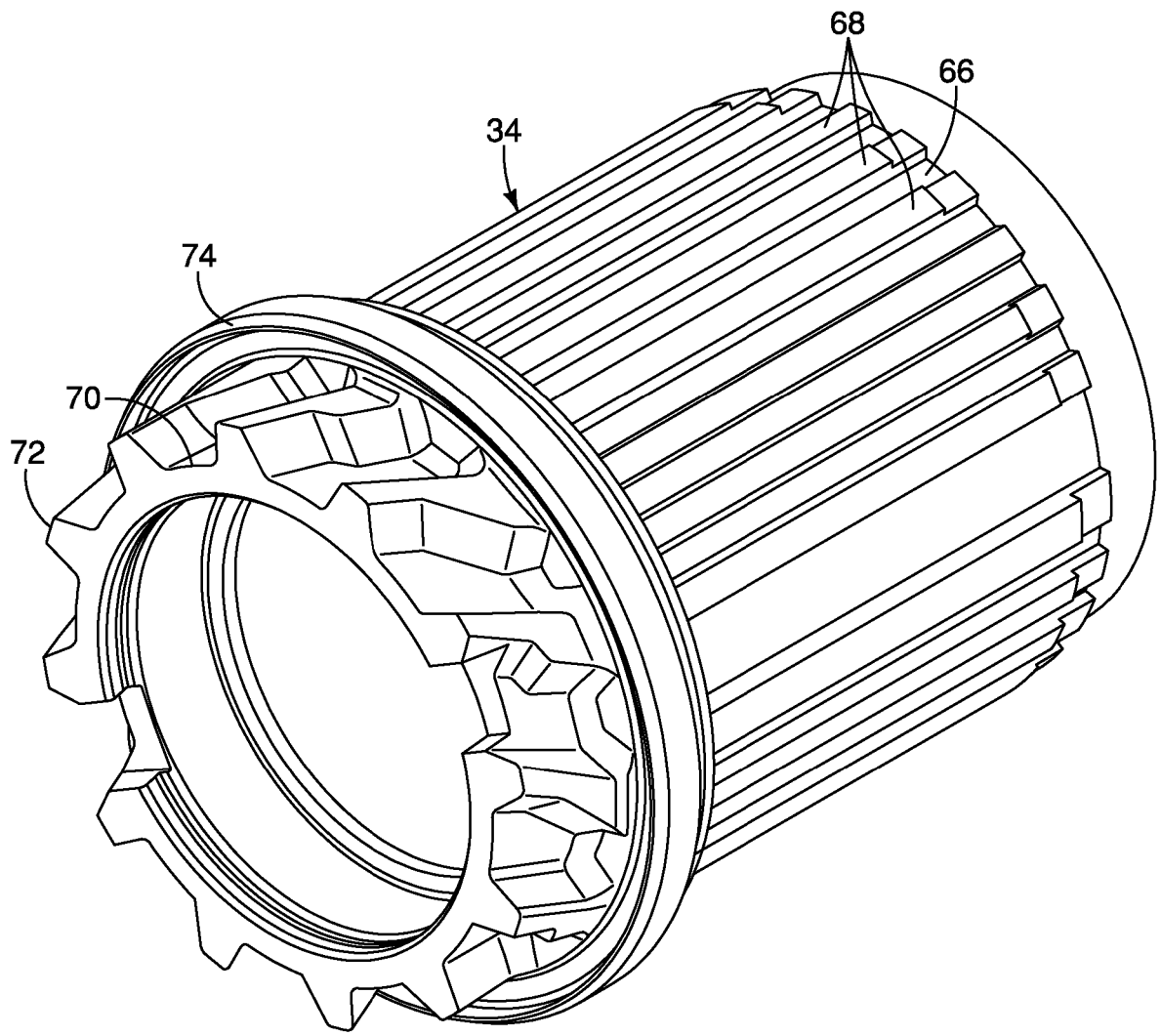
FIG. 10 is a perspective view of the sprocket support of the freewheel of the hub illustrated in FIGS. 1 to 5.

Referring to FIGS. 6, 7 and 10, the sprocket support 34 constitutes a driving member that has a tubular shape. The sprocket support 34 is rotatably mounted on the hub axle 30 to rotate around the rotational axis CA. The sprocket support 34 has an outer peripheral surface 66. The outer peripheral surface 66 is provided with a plurality of axially extending splines 68 for non-rotatably engaging the rear sprockets 20 in a conventional manner. The splines 68 are parallel to each other, and extend parallel to the rotational axis CA. As seen in FIG. 2, the rear sprockets 20 are held on the sprocket support 34 in a conventional manner such as a conventional nut that screws into the sprocket support 34. The sprocket support 34 has another outer peripheral surface 70 having a plurality of helical splines 72 that is helically arranged with respect to the rotational axis CA.

The second ratchet member 52 is movably supported on the outer peripheral surface 70 of the sprocket support 34 via the helical splines 72. The sprocket support 34 also includes an abutment 74 that abuts the first ratchet member 51 to restrict axial movement of the first ratchet member 51 away from the hub body 32. In an axial direction of the rotational axis CA, the first ratchet member 51 is disposed between the abutment 74 and the second ratchet member 52.

Figure 11:
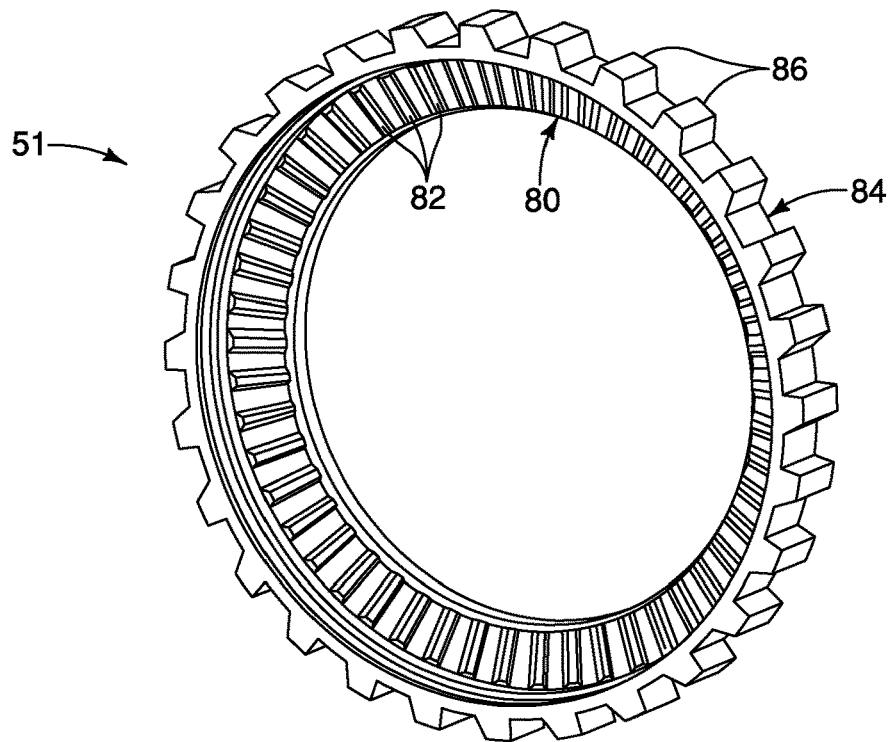
FIG. 11 is a perspective view of the first ratchet member of the hub illustrated in FIGS. 1 to 5.
Figure 12:
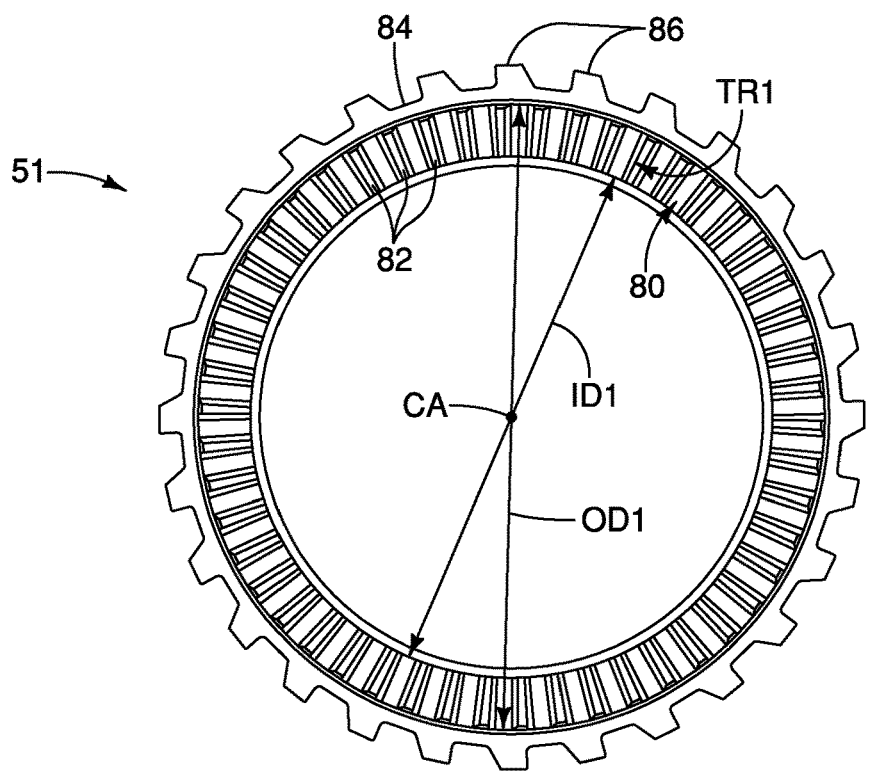
FIG. 12 is a side elevational view of the first ratchet member illustrated in FIG. 11 for the hub illustrated in FIGS. 1 to 5.

Referring to FIGS. 11 and 12, the first ratchet member 51 will now be discussed in more detail. The first ratchet member 51 is an annular member. The first ratchet member 51 includes a first axial surface 80 defining a plurality of first serrated teeth 82. The first axial surface 80 axially faces the second ratchet member 52. The first serrated teeth 82 are configured to engage the second ratchet member 52 so that the first ratchet member 51 and the second ratchet member 52 rotate together in the driving direction D1 and rotate relative to each other in the non-driving direction D2.

Figure 8:
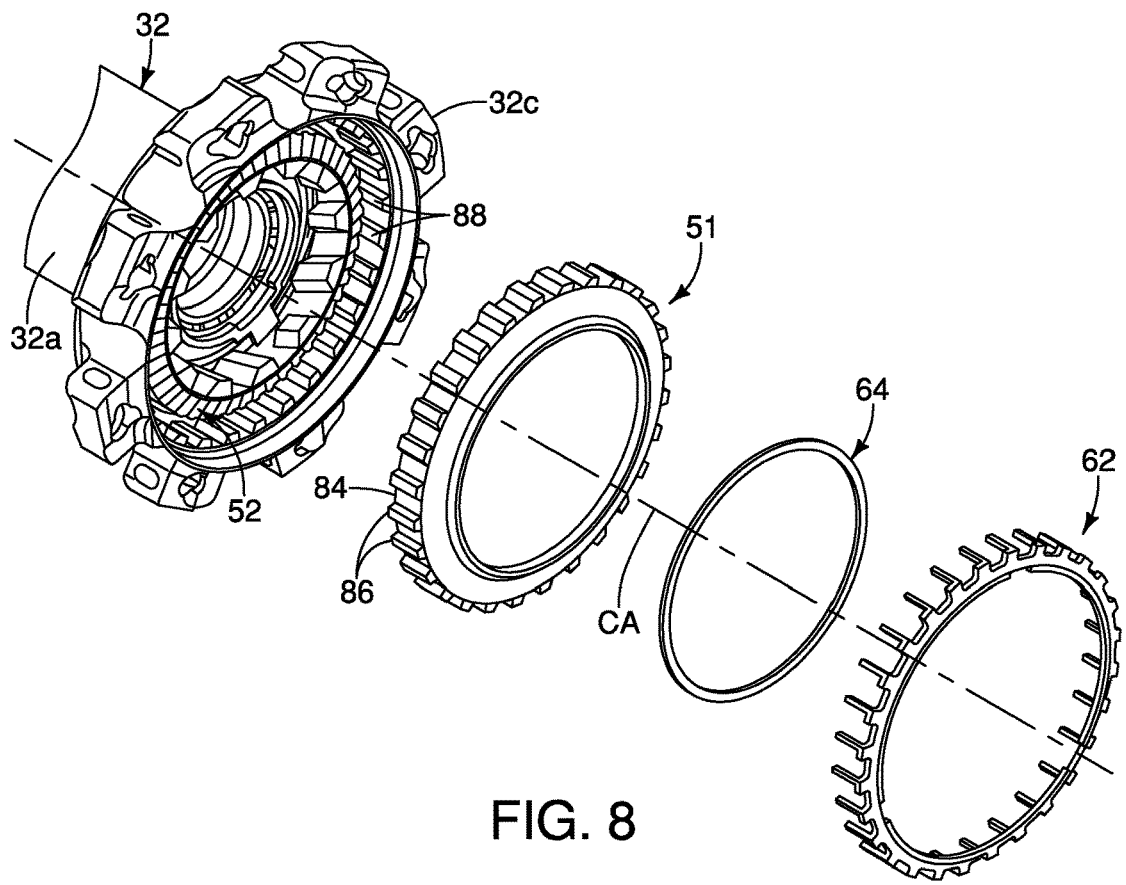
FIG. 8 is an exploded perspective view of other selected parts of the freewheel of the hub illustrated in FIGS. 1 to 5.
Figure 9:
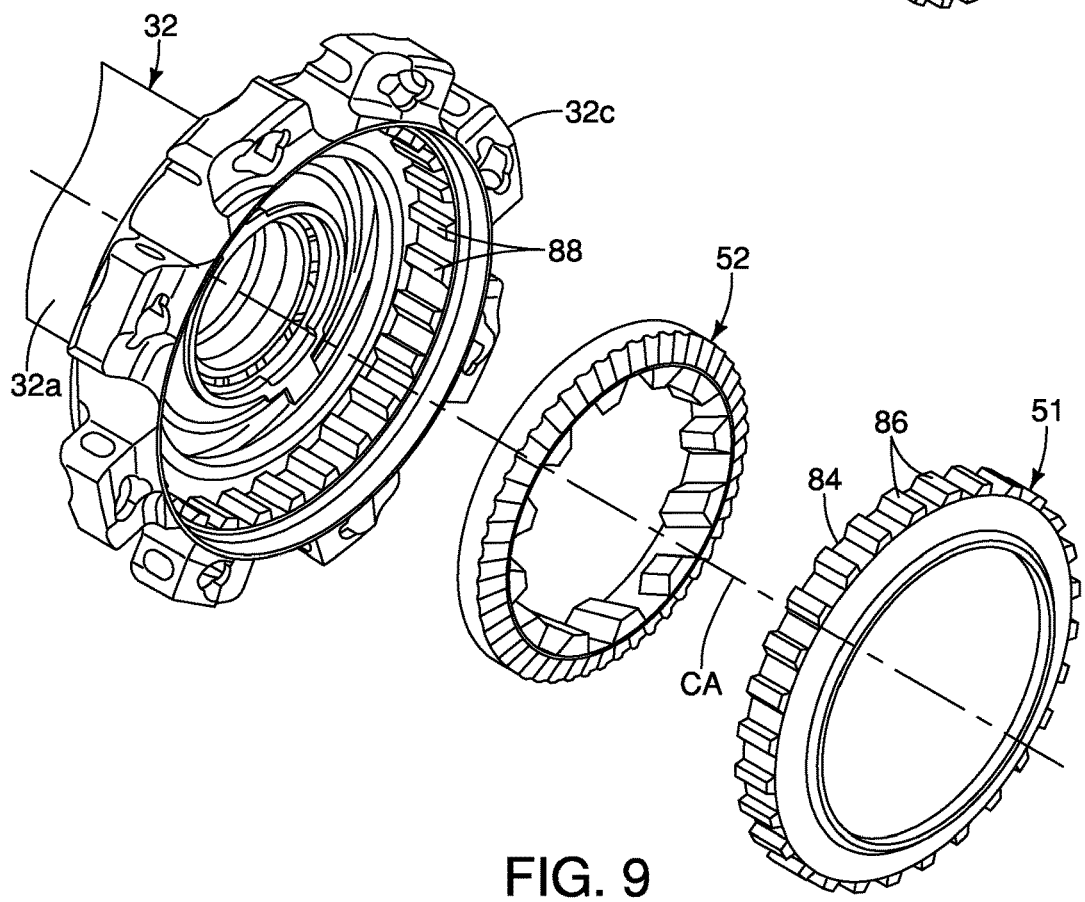
FIG. 9 is an exploded perspective view of other selected parts of the freewheel of the hub illustrated in FIGS. 1 to 5.

Referring to FIGS. 8 and 9, the first ratchet member 51 is a ring-shaped member that is concentrically disposed around the hub axle 30. The first ratchet member 51 is configured to rotate with the hub body 32. In particular, the first ratchet member 51 also includes an outer peripheral surface 84 having a plurality of protrusions 86. The protrusions 86 form a hub shell engagement portion that engages plurality of protrusions 88 of the hub body 32. More specifically, the spacer 62 is disposed between the protrusions 86 of the first ratchet member 51 and the protrusions 88 of the hub body 32 to take up the circumferential spaces between the protrusions 86 of the first ratchet member 51 and the protrusions 88 of the hub body 32. In this way, torque applied from the sprocket support 34 via the second ratchet member 52 is transferred from the first ratchet member 51 to the hub body 32. The first ratchet member 51 is sandwiched between the abutment 74 of the sprocket support 34 and the second ratchet member 52. Here, the spacer 64 is disposed between the first ratchet member 51 and the abutment 74 of the sprocket support 34. In this way, movement of the first ratchet member 51 in the first axial direction A1 is restricted.

Figure 13:
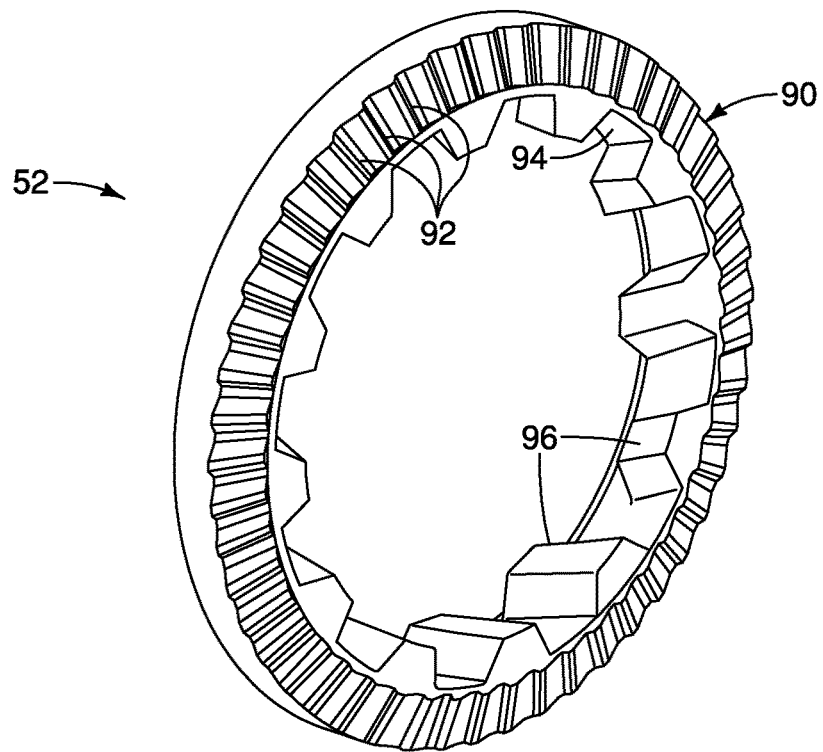
FIG. 13 is a perspective view of the second ratchet member of the hub illustrated in FIGS. 1 to 5.
Figure 14:
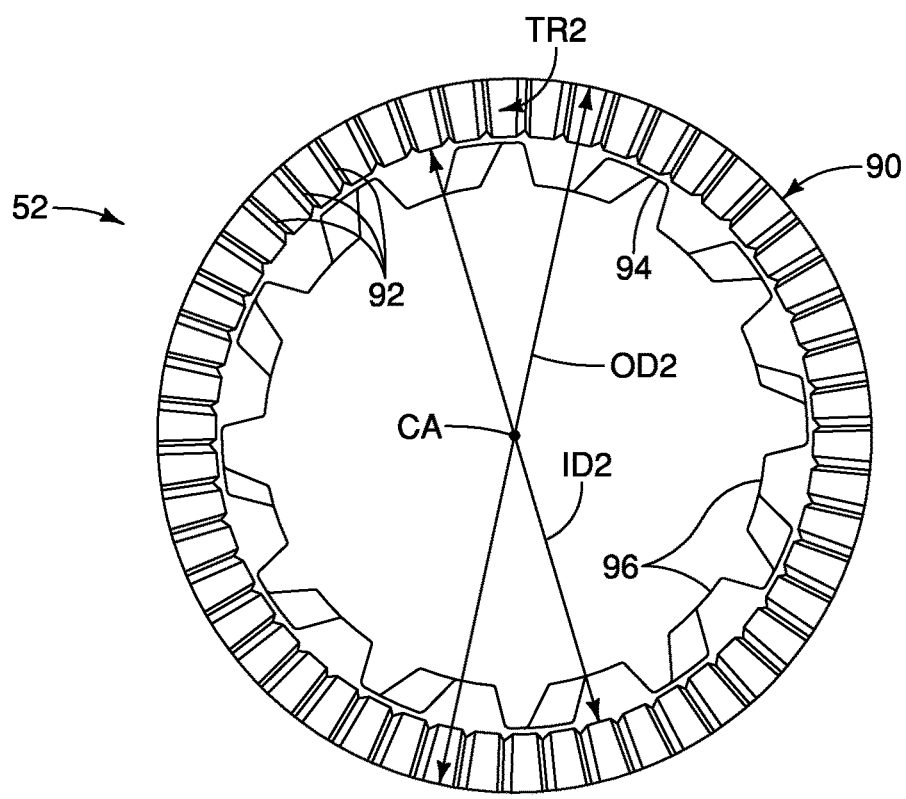
FIG. 14 is a side elevational view of the second ratchet member illustrated in FIG. 11 for the hub illustrated in FIGS. 1 to 5.

Referring to FIGS. 13 and 14, the second ratchet member 52 will now be discussed in more detail. The second ratchet member 52 is an annular member that is concentrically disposed around the hub axle 30. The second ratchet member 52 includes a second axial surface 90 defining a plurality of second serrated teeth 92. The second axial surface 90 axially faces the first axial surface 80 of the first ratchet member 51. The second serrated teeth 92 are configured to engage the first serrated teeth 82 of the first ratchet member 51 so that the first ratchet member 51 and the second ratchet member 52 rotate together in the driving direction D1 and rotate relative to each other in the non-driving direction D2. In other words, the first ratchet member 51 and the second ratchet member 52 are configured to rotate together about the rotational axis CA in the driving direction D1 where the first driving surfaces 82a contact the second driving surfaces 92a. Also, at least one of the first ratchet member 51 and the second ratchet member 52 is movable in the axial direction A1 or A2 of the rotational axis CA to permit relative rotation between the first ratchet member 51 and the second ratchet member 52 about the rotational axis CA in the non-driving direction D2 where the first non-driving surfaces 82b and the second non-driving surfaces 92b slidably contact each other. Here, the second ratchet member 52 is movable in the second axial direction A2 to permit relative rotation between the first ratchet member 51 and the second ratchet member 52 about the rotational axis CA in the non-driving direction D2 where the first non-driving surfaces 82b and the second non-driving surfaces 92b slidably contact each other.

Referring to FIGS. 10, 13 and 14, the second ratchet member 52 is a ring-shaped member that is concentrically disposed around the hub axle 30. The second ratchet member 52 is configured to rotate with the sprocket support 34 as the sprocket support 34 rotates about the rotational axis CA. However, the second ratchet member 52 is configured to move both axially and circumferentially with respect to the sprocket support 34 for limited range of movement. In particular, the second ratchet member 52 also includes an inner peripheral surface 94 having a plurality of helical splines 96 that are helically arranged with respect to the rotational axis CA. The helical splines 96 mates with the helical spline 72 of the sprocket support 34. In this way, the second ratchet member 52 is movably mounted in the axial direction A1 or A2 with respect to the sprocket support 34 via the helical splines 96 engaging the helical splines 72.

Figure 15:
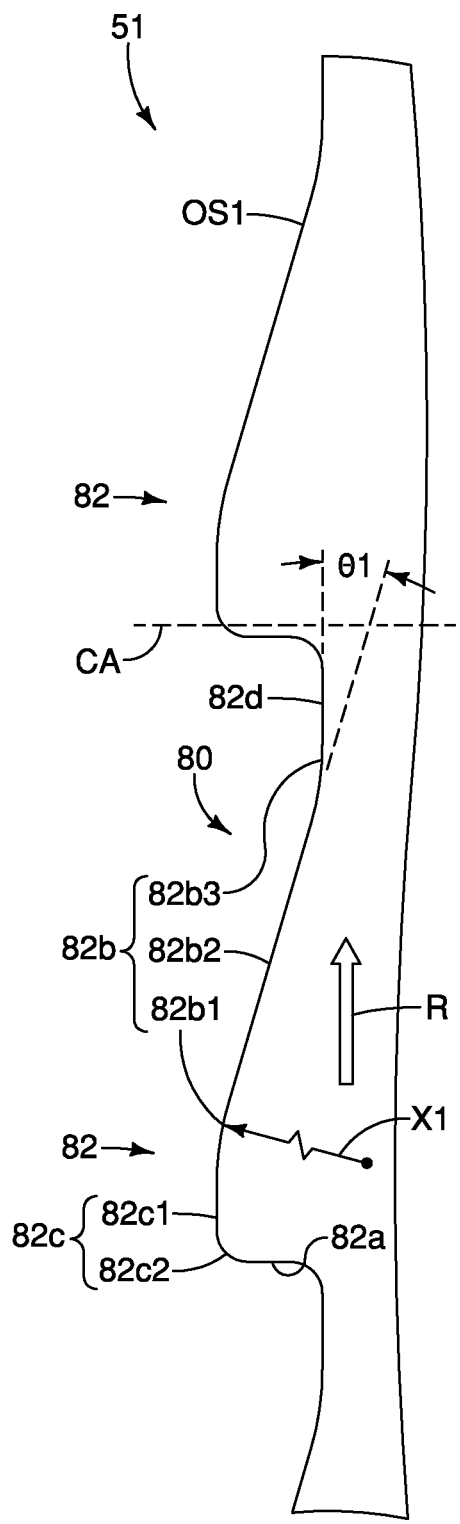
FIG. 15 is an enlarged diagrammatic profile view the first serrated teeth of the first ratchet member for the hub illustrated in FIGS. 1 to 5.

Referring to FIGS. 11, 12 and 15, the first serrated teeth 82 of the first ratchet member 51 will now be discussed in more detail. In the illustrated embodiment, the first ratchet member 51 has a total number of the first serrated teeth 82 that are arranged in a first ring TR1. The first ring TR1 has a first outer ratchet diameter OD1 and a first inner ratchet diameter ID1. In other words, the first ring TR1 is defined by an area between the first outer ratchet diameter OD1 and the first inner ratchet diameter ID1 of the first serrated teeth 82. The first ring TR1 is configured such that a first ratio of the total number of the first serrated teeth 82 divided by the first outer ratchet diameter OD1 is 0.7 or more. Preferably, the first ratio is 1.5 or less. Also, preferably, the first serrated teeth 82 include an outer surface OS1 having an aluminum alloy. For example, the outer surface OS1 can have aluminum alloy coating, or the first serrated teeth 82 can be made of partly or entirely of aluminum alloy.

Basically, the first serrated teeth 82 has a first driving surface 82a, a first non-driving surface 82b and a first tooth tip 82c. In the illustrated embodiment, all of the first serrated teeth 82 have the same shape. However, it will be apparent from this disclosure that the first serrated teeth 82 can have different shapes. In any case, at least one of the first non-driving surfaces 82b includes a first convex curved surface 82b1 that has a first radius of curvature X1 of at least 0.5 mm. Preferably, the first radius of curvature X1 is at least 1.0 mm. More preferably, the first radius of curvature X1 is at least 1.5 mm. An upper limit of the first radius of curvature X1 is preferably one hundred millimeters. However, at the upper limit of the first radius of curvature X1, the first convex curved surface 82b1 can be any curved surface that close to a flat plane. Thus, the first radius of curvature X1 can be, for example, five millimeters, ten millimeters, twenty millimeters, thirty millimeters, fifty millimeters or seventy millimeters. In the illustrated embodiment, all of the first serrated teeth 82 have the first convex curved surface 82b1. However, only one or some of the first serrated teeth 82 can have the first convex curved surface 82b1. In the illustrated embodiment, the first ratchet member 51 further includes a first root surface 82d between adjacent ones of the first serrated teeth 82.

In the illustrated embodiment, the at least one of the first non-driving surfaces 82b has a first tilt angle θ1 with respect to a plane perpendicular to the rotational axis CA that is greater than zero degrees and that is twenty-five degrees or less. Here, the first tilt angle θ1 is the same for all of the first serrated teeth 82. However, all or some of the first serrated teeth 82 can have different tilt angles. Preferably, the first tilt angles θ1 are twenty degrees or less. More preferably, the first tilt angles θ1 are sixteen degrees or less. In the illustrated embodiment, the first tilt angles θ1 are sixteen degrees. In the case where the first non-driving surface 82b includes a planar surface, the first tilt angle θ1 can be measured as an angle between the planar surface and the plane perpendicular to the rotational axis CA. In the case the first non-driving surface 82b does not includes a planar surface, the first tilt angle θ1 can be measured as an angle between a straight line connecting the end points of the first non-driving surface 82b and the plane perpendicular to the rotational axis CA. In the case the first non-driving surface 82b does not includes a planar surface, the first tilt angle θ1 can be measured as an angle between an approximate plane of the first non-driving surface 82b and the plane perpendicular to the rotational axis CA.

In the illustrated embodiment, the at least one of the first non-driving surfaces 82b further include a first planar surface 82b2. Here, all the first serrated teeth 82 include the first planar surface 82b2. However, some of the first serrated teeth 82 can omit the first planar surface 82b2. In other words, only one or some of the first serrated teeth 82 can include the first planar surface 82b2. The first serrated tooth 82 may not include the first plane 82b2. Also, in the illustrated embodiment, the at least one the first non-driving surfaces 82b further include a first concave curved surface 82b3. Here, all the first serrated teeth 82 include the first concave curved surface 82b3. However, some of the first serrated teeth 82 can omit the first concave curved surface 82b3. In other words, only one or some of the first serrated teeth 82 can include the first concave curved surface 82b3. The first serrated tooth 82 may not include the first concave curved surface 82b3. In any case, in the illustrated embodiment, the first planar surface 82b2 connects the first convex curved surface 82b1 and the first concave curved surface 82b3. Thus, the first convex curved surface 82b1 is located between the first tooth tip 82c and the first concave curved surface 82b3 of the at least one the first non-driving surfaces 82b. The first convex curved surface 82b1 is preferably formed near the first tooth tip 82c.

The first tooth tips 82c connect corresponding ones of the first driving surfaces 82a and the first non-driving surfaces 82b. In particular, the first tooth tips 82c connect the first driving surfaces 82a and the first convex curved surface 82b1 of the first non-driving surfaces 82b. Preferably, at least one of the first tooth tips 82c includes a first flat surface 82c1. Here, all the first serrated teeth 82 include the first flat surface 82c1. However, some of the first serrated teeth 82 can omit the first flat surface 82c1. In other words, only one or some of the first serrated teeth 82 can include the first flat surface 82c1. The first serrated tooth 82 may not include the first flat surface 82c1. In the illustrated embodiment, each of the first tooth tips 82c further includes a first non-sharp surface 82c2 that connects the first flat surface 82c1 to the first driving surfaces 82a. However, some of the first serrated teeth 82 can omit the first non-sharp surface 82c2. In other words, only one or some of the first serrated teeth 82 can include the first non-sharp surface 82c2. The first serrated tooth 82 may not include the first non-sharp surface 82c2. Here, the first non-sharp surface 82c2 includes a convex surface, but is not limited to that shape.

The first ratchet member 51 can be formed using a pair of straight-pull molds in which the straight-pull molds are separated in a direction parallel to the rotational axis CA. Thus, the first serrated teeth 82 are configured such that the first serrated teeth 82 do not include any undercut surfaces as viewed in the direction parallel to the rotational axis CA. For example, the first convex curved surface 82b1 does not undercut in the direction of the rotational axis CA. However, by providing an opening adjacent to the first drive surface 82a, the first drive surface 82a can have an undercut shape. Also, preferably, the first serrated teeth 82 all have the same height at the first tooth tips 82c as measured in a direction parallel to the rotational axis CA.

Figure 16:
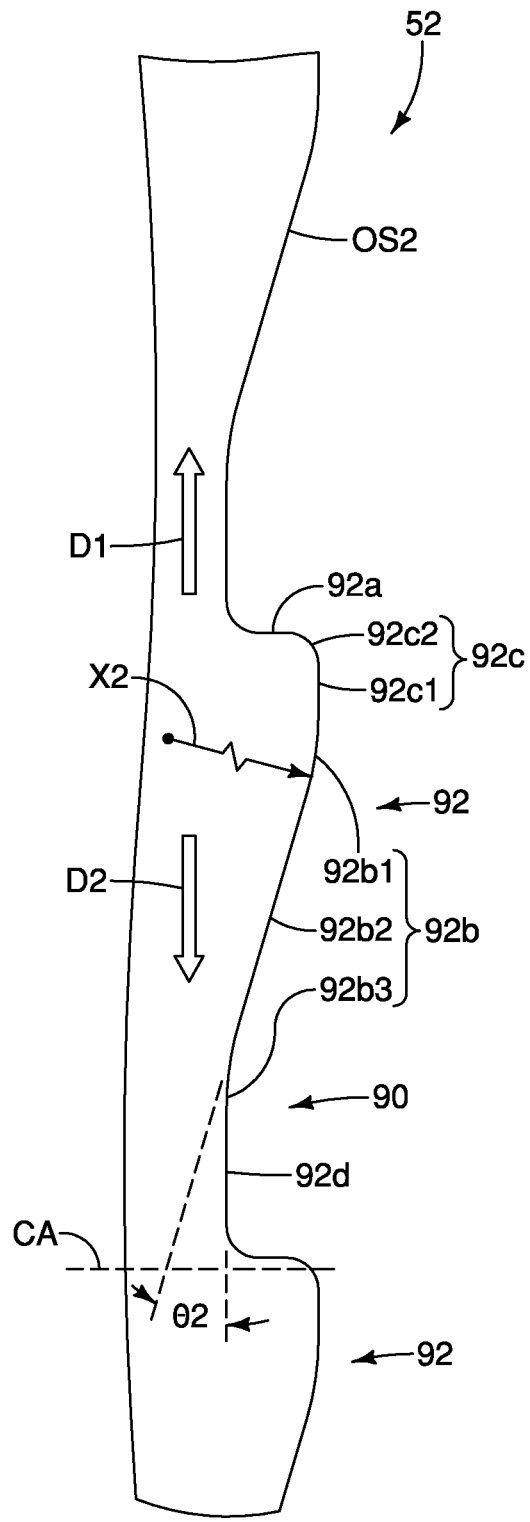
FIG. 16 is an enlarged diagrammatic profile view the second serrated teeth of the second ratchet member for the hub illustrated in FIGS. 1 to 5.

Referring to FIGS. 13, 14 and 16, the second serrated teeth 92 of the second ratchet member 52 will now be discussed in more detail. In the illustrated embodiment, the second ratchet member 52 has a total number of the second serrated teeth 92 that are arranged in a second ring TR2. The second ring TR2 has a second outer ratchet diameter OD2 and a second inner ratchet diameter ID2. In other words, the second ring TR2 is defined by an area between the second outer ratchet diameter OD1 and the second inner ratchet diameter ID2 of the second serrated teeth 82. The second ring TR2 is configured such that a second ratio of the total number of the second serrated teeth 92 divided by the second outer ratchet diameter OD2 is 0.7 or more. Preferably, the second ratio is 1.5 or less. Also, preferably, the second serrated teeth 92 include an outer surface OS2 having an aluminum alloy. For example, the outer surface OS2 can have aluminum alloy coating, or the second serrated teeth 92 can be made of partly or entirely of aluminum alloy.

Basically, the second serrated teeth 92 has a second driving surface 92a, a second non-driving surface 92b and a second tooth tip 92c. In the illustrated embodiment, all of the second serrated teeth 92 have the same shape. However, it will be apparent from this disclosure that the second serrated teeth 92 can have different shapes. In any case, at least one of the second non-driving surfaces 92b including a second convex curved surface 92b1 that has a second radius of curvature X2 of at least 0.5 mm. Preferably, the second radius of curvature X2 is at least 1.0 mm. More preferably, the second radius of curvature X2 is at least 1.5 mm. An upper limit of the second radius of curvature X2 is preferably one hundred millimeters. However, at the upper limit of the second radius of curvature X2, the second convex curved surface 92b1 can be any curved surface that close to a flat plane. Thus, the second radius of curvature X2 can be, for example, five millimeters, ten millimeters, twenty millimeters, thirty millimeters, fifty millimeters or seventy millimeters. In the illustrated embodiment, all of the second driving surface 92a have the second convex curved surface 92b1. However, only one or some of the second serrated teeth 92 can have the second convex curved surface 92b1. In the illustrated embodiment, the second ratchet member 52 further includes a second root surface 92d between adjacent ones of the second serrated teeth 92.

In the illustrated embodiment, the at least one of the second non-driving surfaces 92b has a second tilt angle θ2 with respect to a plane perpendicular to the rotational axis CA that is greater than zero degrees and that is twenty-five degrees or less. Here, the second tilt angle θ2 is the same for all of the second serrated teeth 92. However, all or some of the second serrated teeth 92 can have different tilt angles. Preferably, the second tilt angles θ2 are twenty degrees or less. More preferably, the second tilt angles θ2 are sixteen degrees or less. In the illustrated embodiment, the second tilt angles θ2 are sixteen degrees. In the case where the first non-driving surface 92b includes a planar surface, the second tilt angle θ2 can be measured as an angle between the planar surface and the plane perpendicular to the rotational axis CA. In the case the second non-driving surface 92b does not includes a planar surface, the second tilt angle θ2 can be measured as an angle between a straight line connecting the end points of the second non-driving surface 92b and the plane perpendicular to the rotational axis CA. In the case the second non-driving surface 92b does not includes a planar surface, the second tilt angle θ2 can be measured as an angle between an approximate plane of the second non-driving surface 82b and the plane perpendicular to the rotational axis CA.

In the illustrated embodiment, the at least one of the second non-driving surfaces 92b further includes a second planar surface 92b2. Here, all the second serrated teeth 92 include the second planar surface 92b2. However, some of the second serrated teeth 92 can omit the second planar surface 92b2. In other words, only one or some of the second serrated teeth 92 can include the second planar surface 92b2. The second serrated tooth 92 may not include the second plane 92b2. Also, in the illustrated embodiment, the at least one of the second non-driving surfaces 92b further includes a second concave curved surface 92b3. Here, all the second serrated teeth 92 include the second concave curved surface 92b3. However, some of the second serrated teeth 92 can omit the second concave curved surface 92b3. In other words, only one or some of the second serrated teeth 92 can include the second concave curved surface 92b3. The second serrated tooth 92 may not include the second concave curved surface 92b3. In any case, in the illustrated embodiment, the second planar surface 92b2 connects the second convex curved surface 92b1 and the second concave curved surface 92b3. Thus, the second convex curved surface 92b1 is located between the second tooth tip 92c and the second concave curved surface 92b3 of the at least one the second non-driving surfaces 92b. The second convex curved surface 92b1 is preferably formed near the second tooth tip 92c.

The second tooth tips 92c connects corresponding ones of the second driving surfaces 92a and the second non-driving surfaces 92b. In particular, the second tooth tips 92c connect the second driving surfaces 92a and the second convex curved surface 92b1 of the second non-driving surfaces 92b. Preferably, at least one of the second tooth tips 92c includes a second flat surface 92c1. Here, all the second serrated teeth 92 include the second flat surface 92c1. However, some of the second serrated teeth 92 can omit the second flat surface 92c1. In other words, only one or some of the second serrated teeth 92 can include the second flat surface 92c1. The second serrated tooth 92 may not include the second flat surface 92c1. In the illustrated embodiment, each of the second tooth tips 92c further includes a second non-sharp surface 92c2 that connects the second flat surface 92c1 to the second driving surfaces 92a. However, some of the second serrated teeth 92 can omit the second non-sharp surface 92c2. In other words, only one or some of the second serrated teeth 92 can include the second non-sharp surface 92c2. The second serrated tooth 92 may not include the second non-sharp surface 92c2. Here, the first non-sharp surface 92c2 includes a convex surface, but is not limited to that shape.

The second ratchet member 52 can be formed using a pair of straight-pull molds in which the straight-pull molds are separated in a direction parallel to the rotational axis CA. Thus, the second serrated teeth 92 are configured such that the second serrated teeth 92 do not include any undercut surfaces as viewed in the direction parallel to the rotational axis CA. For example, the second convex curved surface 92b1 does not undercut in the direction of the rotational axis CA. However, by providing an opening adjacent to the second drive surface 92a, the second drive surface 92a can have an undercut shape. Also, preferably, the second serrated teeth 92 all have the same height at the second tooth tips 92c as measured in a direction parallel to the rotational axis CA.

Figure 17:
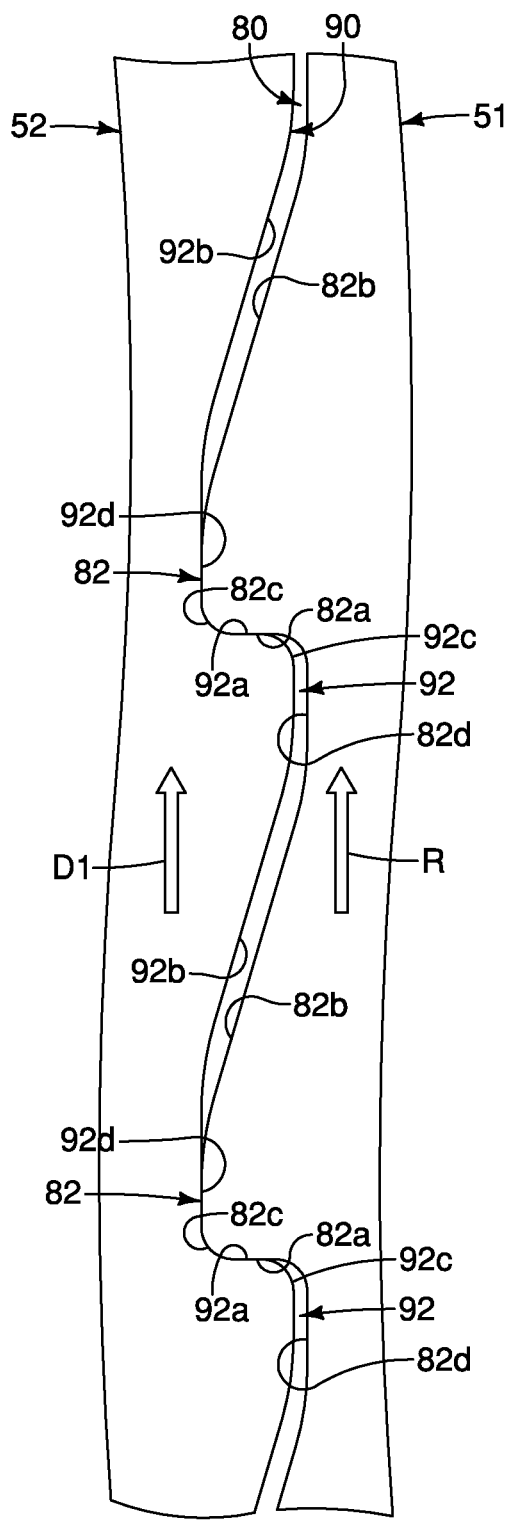
FIG. 17 is an enlarged diagrammatic profile view the first serrated teeth of the first ratchet member and the second serrated teeth of the second ratchet member for the hub illustrated in FIGS. 1 to 5 in which the first serrated teeth are engaged with the second serrated teeth for driving the hub body of the hub as the sprocket support rotates in a driving direction.
Figure 18:
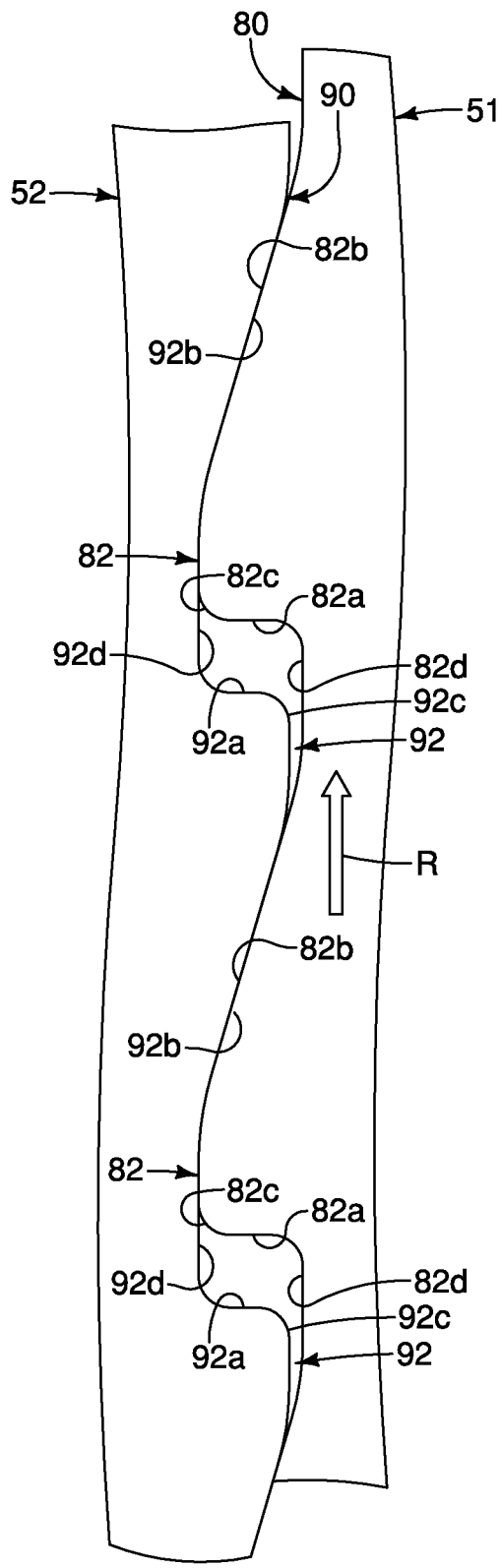
FIGS. 18 to 22 are a series of enlarged diagrammatic profile view, similar to FIG. 17, but in which the first serrated teeth are sliding relative to second serrated teeth as the hub body rotates while the sprocket support remains stationary.
Figure 19:
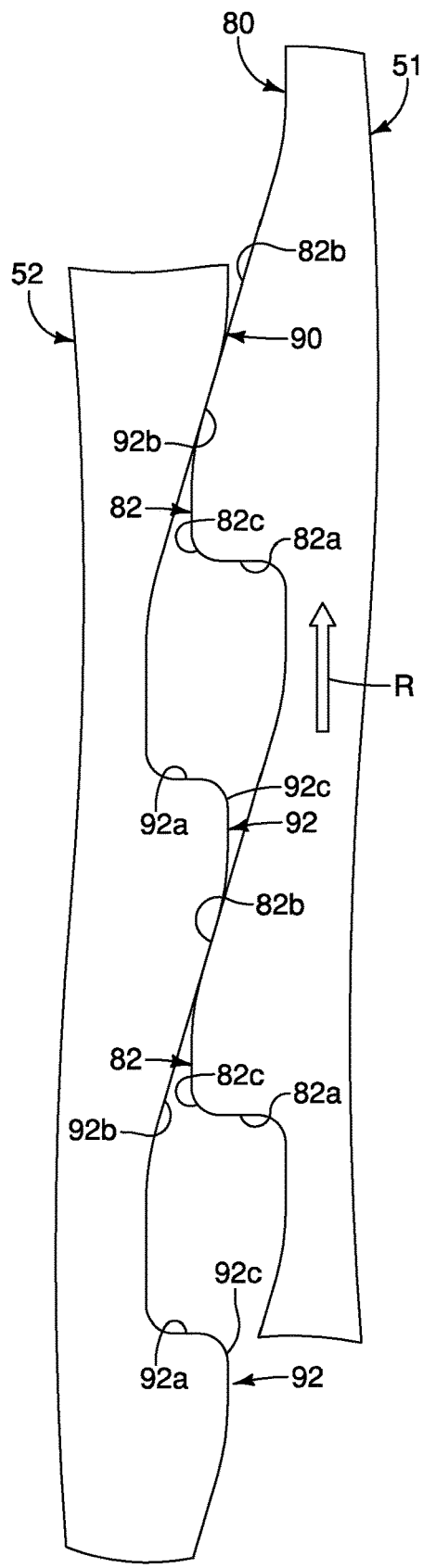
Figure 20:
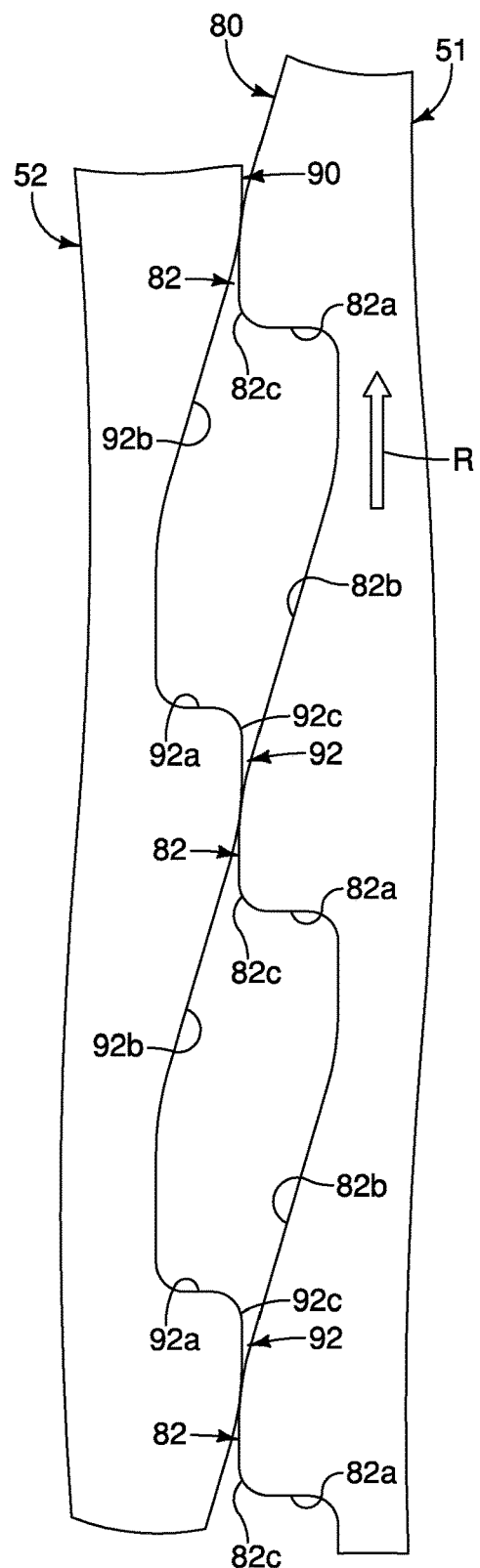
Figure 21:
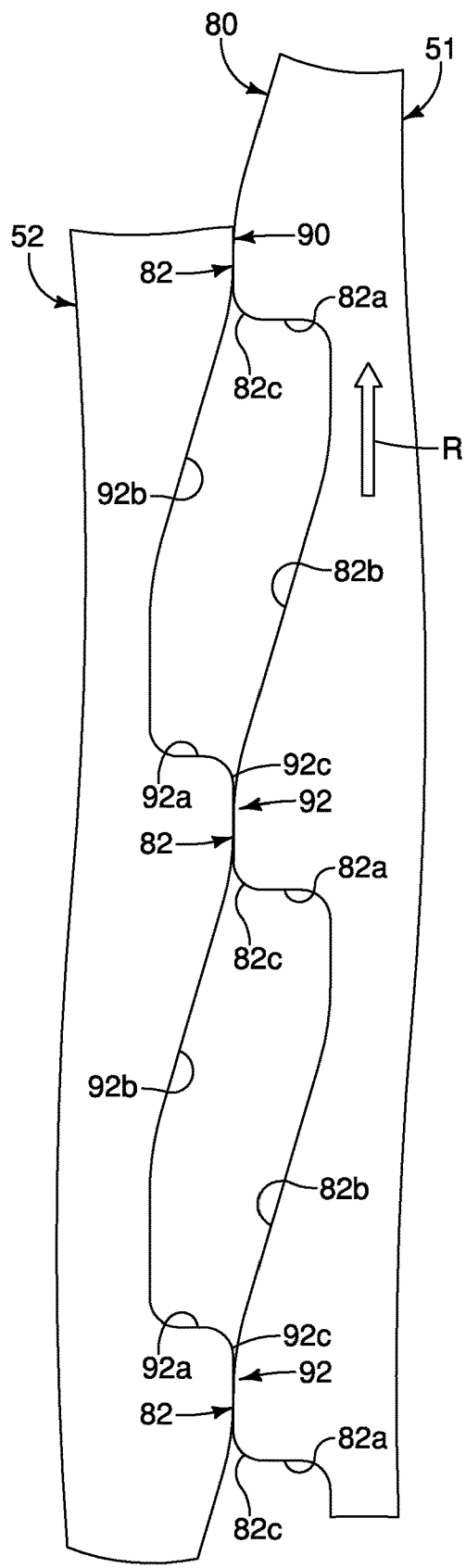
Figure 22:
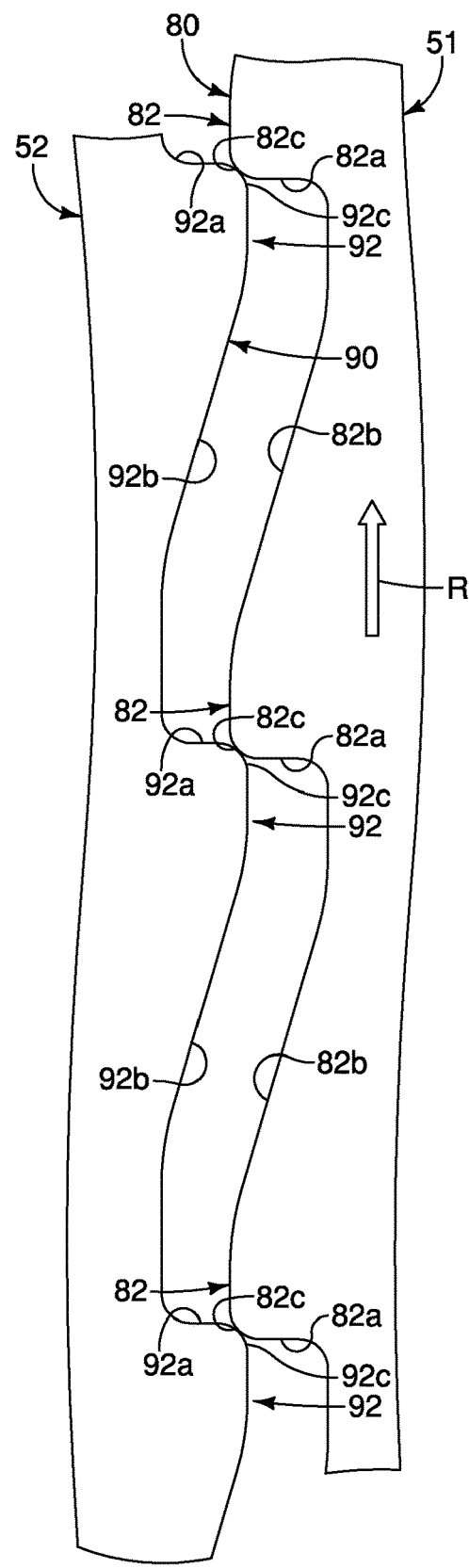

Referring to FIGS. 17 to 18, a coasting situation is illustrated. In FIG. 17, the first serrated teeth 82 of the first ratchet member 51 and the second serrated teeth 92 of the second ratchet member 52 are engaged for driving the hub body 32 of the hub 10 as the sprocket support 34 rotates in the driving direction D1. In FIGS. 18 to 22, the first serrated teeth 82 are sliding relative to each other as the sprocket support rotates in a non-driving direction.

With the sprocket support 34 rotates in the driving direction D1, at least one of the second tooth tips 92c is spaced from the first root surfaces 82d where the first driving surfaces 82a are engaged with the second driving surfaces 92a. Here, all of the second tooth tips 92c are spaced from the first root surfaces 82d where the first driving surfaces 82a are engaged with the second driving surfaces 92a. However, one or some of the second tooth tips 92c spaced can be spaced from the first root surfaces 82d.

Figure 23:
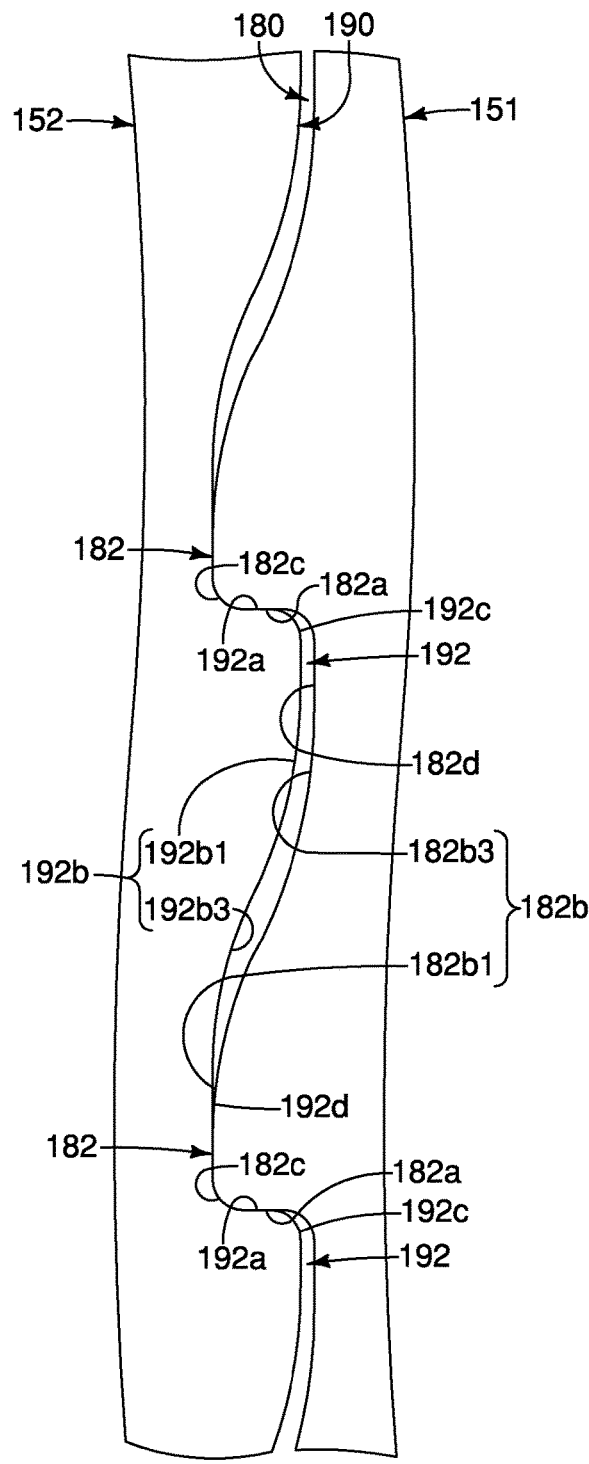
FIG. 23 is an enlarged diagrammatic profile view modified first serrated teeth of a first ratchet member and modified second serrated teeth of a second ratchet member for the hub illustrated in FIGS. 1 to 5 in which the first serrated teeth are engaged with the second serrated teeth for driving the hub body of the hub as the sprocket support rotates in a driving direction.

Referring now to FIG. 23, a portion of a first ratchet member 151 and a portion of a second ratchet member 152 are partly illustrated in accordance with a first modification. The first ratchet member 151 and the second ratchet member 152 can be used in the hub 10 instead of the first ratchet member 51 and the second ratchet member 52 discussed above. The first ratchet member 151 includes a first axial surface 180 defining a plurality of first serrated teeth 182. The second ratchet member 152 includes a second axial surface 190 defining a plurality of second serrated teeth 192. The first ratchet member 151 and the second ratchet member 152 are identical to the first ratchet member 51 and the second ratchet member 52, discussed above, except that shapes the first serrated teeth 182 and shapes the second serrated teeth 192 are modified.

In this first modification, each of the first serrated teeth 182 has a first driving surface 182a, a first non-driving surface 182b, a first tooth tip 182c and a first root surface 182d. Alternatively, only one or some of the first serrated teeth 182 can have the same configuration. The first driving surface 182a, the first tooth tip 182c and the first root surface 182d have the same shape as the first driving surface 82a, the first tooth tip 82c and the first root surface 82d. In other words, only the first non-driving surfaces 182b of the first serrated teeth 182 are different from the first serrated teeth 82. Here, each of the first non-driving surfaces 182b includes a first convex curved surface 182b1 and a first concave curved surface 182b3. Alternatively, only one or some of the first serrated teeth 182 can have both the first convex curved surface 182b1 and the first concave curved surface 182*b*3. In any case, at least one of the first serrated teeth 182 has the first convex curved surface 182*b*1.

Here, the first non-driving surfaces 182*b* do not include a first planar surface. Rather, the first convex curved surface 182*b*1 and the first concave curved surface 182*b*3 for the at least one of the first non-driving surfaces 182*b* are continuous without a planar surface therebetween. The first convex curved surface 182*b*1 has a radius of curvature that is identical to the first convex curved surface 82*b*1, discussed above. However, for example, the first convex curved surface 182*b*1 is longer than the first convex curved surface 82*b*1 such that the first convex curved surface 182*b*1 is contiguous with the first concave curved surface 182*b*3. Also, for example, the first concave curved surface 182*b*3 is longer than the first concave curved surface 82*b*3 so that the first convex curved surface 182*b*1 and the first concave curved surface 182*b*3 are contiguous with each other.

Likewise, in this first modification, each of the second serrated teeth 192 has a second driving surface 192*a*, a second non-driving surface 192*b*, a second tooth tip 192*c* and a second root surface 192*d*. Alternatively, only one or some of the second serrated teeth 192 can have the same configuration. The second driving surface 192*a*, the second tooth tip 192*c* and the second root surface 192*d* have the same shape as the second driving surface 92*a*, the second tooth tip 92*c* and the second root surface 92*d*. In other words, only the second non-driving surfaces 192*b* of the second serrated teeth 192 are different from the second serrated teeth 92. Here, each of the second non-driving surfaces 192*b* includes a second convex curved surface 192*b*1 and a second concave curved surface 192*b*3. Alternatively, only one or some of the second serrated teeth 192 can have both the second convex curved surface 192*b*1 and the second concave curved surface 192*b*3. In any case, at least one of the second serrated teeth 192 has the second convex curved surface 192*b*1.

Here, the second non-driving surfaces 192*b* do not include a second planar surface. Rather, the second convex curved surface 92*b*1 and the second concave curved surface for the at least one of the second non-driving surfaces 92*b* are continuous without a planar surface therebetween. The second convex curved surface 192*b*1 has a radius of curvature that is identical to the second convex curved surface 92*b*1, discussed above. However, for example, the second convex curved surface 192*b*1 is longer than the second convex curved surface 92*b*1 such that the second convex curved surface 192*b*1 is contiguous with the second concave curved surface 192*b*3. Also, for example, the second concave curved surface 192*b*3 is longer than the second concave curved surface 92*b*3 so that the second convex curved surface 192*b*1 and the second concave curved surface 192*b*3 are contiguous with each other.

Figure 24:
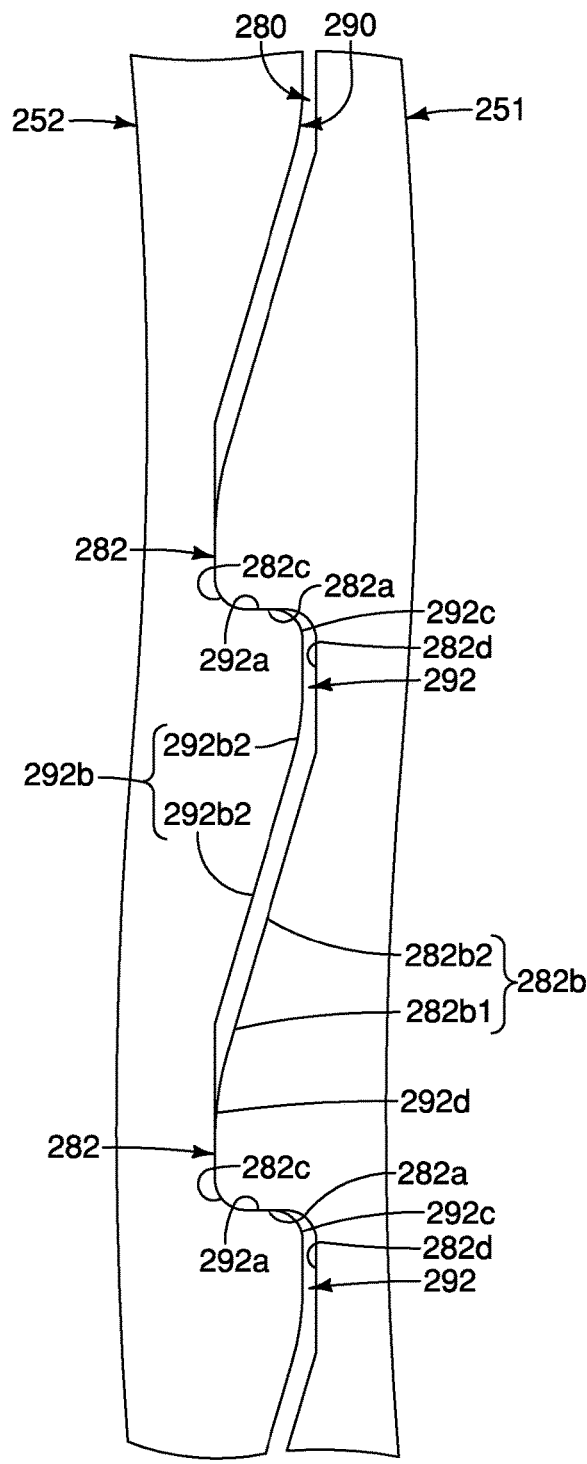
FIG. 24 is an enlarged diagrammatic profile view modified first serrated teeth of a first ratchet member and modified second serrated teeth of a second ratchet member for the hub illustrated in FIGS. 1 to 5 in which the first serrated teeth are engaged with the second serrated teeth for driving the hub body of the hub as the sprocket support rotates in a driving direction.

Referring now to FIG. 24, a portion of a first ratchet member 251 and a portion of a second ratchet member 252 are partly illustrated in accordance with a second modification. The first ratchet member 251 and the second ratchet member 252 can be used in the hub 10 instead of the first ratchet member 51 and the second ratchet member 52 discussed above. The first ratchet member 251 includes a first axial surface 280 defining a plurality of first serrated teeth 282. The second ratchet member 252 includes a second axial surface 290 defining a plurality of second serrated teeth 292. The first ratchet member 251 and the second ratchet member 252 are identical to the first ratchet member 51 and the second ratchet member 52, discussed above, except that shapes the first serrated teeth 282 and shapes the second serrated teeth 292 are modified.

In this second modification, each of the first serrated teeth 282 has a first driving surface 282*a*, a first non-driving surface 282*b*, a first tooth tip 282*c* and a first root surface 282*d*. Alternatively, only one or some of the first serrated teeth 282 can have the same configuration. The first driving surface 282*a*, the first tooth tip 282*c* and the first root surface 282*d* have the same shape as the first driving surface 82*a*, the first tooth tip 82*c* and the first root surface 82*d*. In other words, only the first non-driving surfaces 282*b* of the first serrated teeth 282 are different from the first serrated teeth 82. Here, each of the first non-driving surfaces 282*b* includes a first convex curved surface 282*b*1 and a first planar surface 282*b*2. Alternatively, only one or some of the first serrated teeth 282 can have both the first convex curved surface 282*b*1 and the first planar surface 282*b*2. In any case, at least one of the first serrated teeth 282 has the first convex curved surface 282*b*1.

Here, the first non-driving surfaces 282*b* do not include a first concave curved surface. Rather, the first planar surface 282*b*2 extends contiguous between the first convex curved surface 282*b*1 and first root surface 282*d* for the at least one of the first non-driving surfaces 282*b* without a concave curved surface therebetween. The first convex curved surface 282*b*1 has a radius of curvature that is identical to the first convex curved surface 82*b*1, discussed above.

Likewise, in this second modification, each of the second serrated teeth 292 has a second driving surface 292*a*, a second non-driving surface 292*b*, a second tooth tip 292*c* and a second root surface 292*d*. Alternatively, only one or some of the second serrated teeth 292 can have the same configuration. The second driving surface 292*a*, the second tooth tip 292*c* and the second root surface 292*d* have the same shape as the second driving surface 92*a*, the second tooth tip 92*c* and the second root surface 92*d*. In other words, only the second non-driving surfaces 292*b* of the second serrated teeth 292 are different from the second serrated teeth 92. Here, each of the second non-driving surfaces 292*b* includes a second convex curved surface 292*b*1 and a second planar surface 292*b*2. Alternatively, only one or some of the second serrated teeth 292 can have both the second convex curved surface 292*b*1 and the second planar surface 292*b*2. In any case, at least one of the second serrated teeth 292 has the second convex curved surface 292*b*1.

Here, the second non-driving surfaces 292*b* do not include a second concave curved surface. Rather, the second planar surface 292*b*2 extends contiguous between the second convex curved surface 292*b*1 and second root surface 292*d* for the at least one of the second non-driving surfaces 292*b* without a concave curved surface therebetween. The second convex curved surface 292*b*1 has a radius of curvature that is identical to the second convex curved surface 92*b*1, discussed above.

Figure 25:
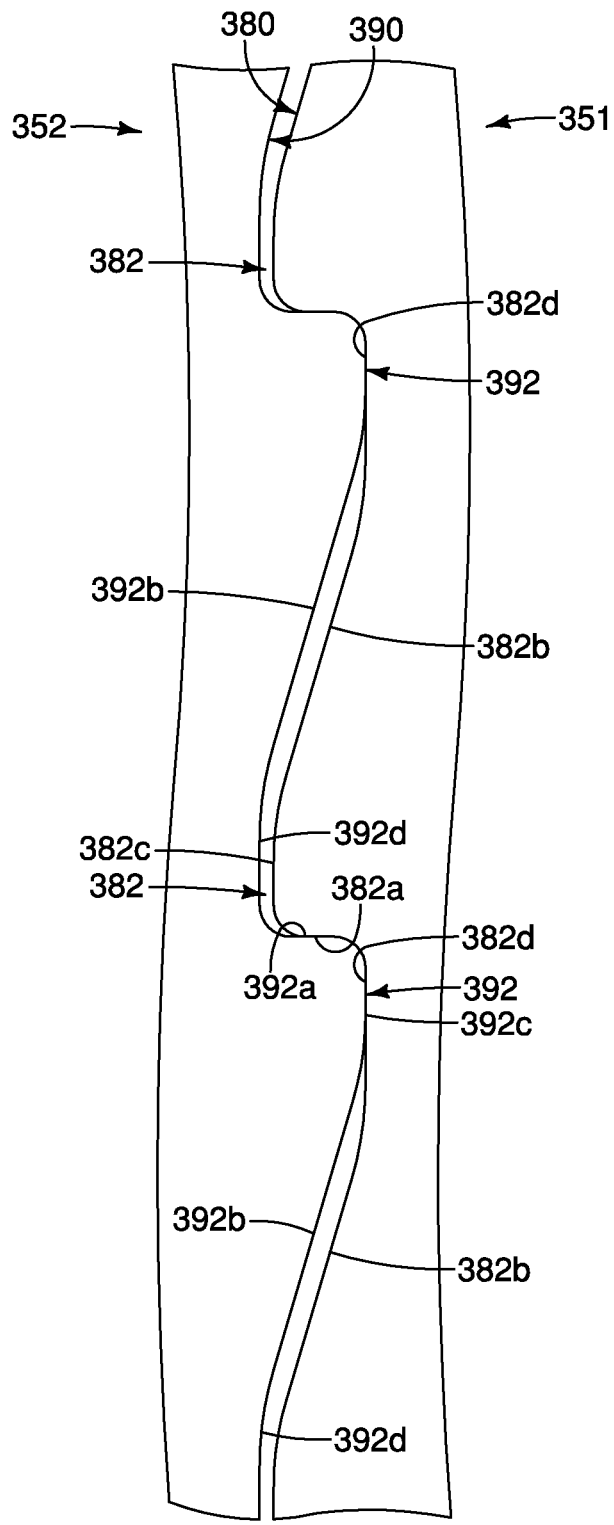
FIG. 25 is an enlarged diagrammatic profile view modified first serrated teeth of a first ratchet member and modified second serrated teeth of a second ratchet member for the hub illustrated in FIGS. 1 to 5 in which the first serrated teeth are engaged with the second serrated teeth for driving the hub body of the hub as the sprocket support rotates in a driving direction.

Referring now to FIG. 25, a portion of a first ratchet member 351 and a portion of a second ratchet member 352 are partly illustrated in accordance with a third modification. The first ratchet member 351 and the second ratchet member 352 can be used in the hub 10 instead of the first ratchet member 51 and the second ratchet member 52 discussed above. The first ratchet member 351 includes a first axial surface 380 defining a plurality of first serrated teeth 382. The second ratchet member 352 includes a second axial surface 390 defining a plurality of second serrated teeth 392. The first ratchet member 351 and the second ratchet member 352 are identical to the first ratchet member 51 and the second ratchet member 52, discussed above, except that shapes the first serrated teeth 282 and shapes the second serrated teeth 392 are modified.

In this third modification, each of the first serrated teeth 382 has a first driving surface 382a, a first non-driving surface 382b, a first tooth tip 382c and a first root surface 382d. Alternatively, only one or some of the first serrated teeth 382 can have the same configuration. Likewise, in this second modification, each of the second serrated teeth 392 has a second driving surface 392a, a second non-driving surface 392b, a second tooth tip 392c and a second root surface 392d. Alternatively, only one or some of the second serrated teeth 392 can have the same configuration.

Here, the first serrated teeth 382 have the same shape as the second serrated teeth 92, while the second serrated teeth 392 have the same shape as the first serrated teeth 82. However, the direction of the first serrated teeth 382 are inverted relative to the second serrated teeth 92, and the direction of the second serrated teeth 392 relative to the first serrated teeth 82. In this way, the first serrated teeth 382 can engage the second serrated teeth 392 to drive the sprocket support 34 in the driving direction. As a result of this configuration of the first serrated teeth 382 and the second serrated teeth 392, the first tooth tips 382c are spaced from the second root surfaces 392d where the first driving surfaces 382a are engaged with the second driving surfaces 392a. As mentioned above, the first ratchet member 351 and the second ratchet member 352 can be configured as that only one or some of the first serrated teeth 382 and only one or some of the second serrated teeth 392 have this configuration. In other words, the at least one of the first tooth tips 382c is spaced from the second root surfaces 392d where the first driving surfaces 382a are engaged with the second driving surfaces 392a.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle field (e.g., bicycle) in an upright, riding position and equipped with the planar ratchet assembly. Accordingly, these directional terms, as utilized to describe the planar ratchet assembly should be interpreted relative to a human-powered vehicle field (e.g., bicycle) in an upright riding position on a horizontal surface and that is equipped with the planar ratchet assembly. The terms "left" and "right" are used to indicate the "right" when referencing from the right side as viewed from the rear of the human-powered vehicle field (e.g., bicycle), and the "left" when referencing from the left side as viewed from the rear of the human-powered vehicle field (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A planar ratchet assembly for a human-powered vehicle, the planar ratchet assembly comprising:
  a first ratchet member including a first axial surface defining a plurality of first serrated teeth, the first serrated teeth having a first driving surface, a first non-driving surface and a first tooth tip, the first tooth tips connecting corresponding ones of the first driving surfaces and the first non-driving surfaces, at least one of the first non-driving surfaces including a first convex curved surface that has a first radius of curvature of at least 0.5 mm; and a second ratchet member including a second axial surface defining a plurality of second serrated teeth, the second serrated teeth having a second driving surface, a second non-driving surface and a second tooth tip, the second tooth tips connecting corresponding ones of the second driving surfaces and the second non-driving surfaces, at least one of the second non-driving surfaces including a second convex curved surface that has a second radius of curvature of at least 0.5 mm, the first ratchet member and the second ratchet member being configured to rotate together about a rotational axis in a driving direction where the first driving surfaces contact the second driving surfaces, and at least one of the first ratchet member and the second ratchet member being movable in an axial direction of the rotational axis to permit relative rotation between the first ratchet member and the second ratchet member about the rotational axis in a non-driving direction where the first non-driving surfaces and the second non-driving surfaces slidably contact each other, the at least one of the first non-driving surfaces including a first planar surface extending at least in the axial direction, the first tooth tips including a first flat surface extending substantially perpendicularly with respect to the axial direction, and the first convex curved surface connecting the first planar surface and the first flat surface.

2. The planar ratchet assembly according to claim 1, wherein
the first radius of curvature is at least 1.0 mm.

3. The planar ratchet assembly according to claim 2, wherein
the first radius of curvature is at least 1.5 mm.

4. The planar ratchet assembly according to claim 1, wherein
the at least one of the first non-driving surfaces further includes a first planar surface.

5. The planar ratchet assembly according to claim 1, wherein
the at least one of the first non-driving surfaces further includes a first concave curved surface.

6. The planar ratchet assembly according to claim 5, wherein
the first convex curved surface is located between the first tooth tip and the first concave curved surface of the at least one of the first non-driving surfaces.

7. The planar ratchet assembly according to claim 5, wherein
the at least one of the first non-driving surfaces further includes a first planar surface connecting the first convex curved surface and the first concave curved surface.

8. The planar ratchet assembly according to claim 5, wherein
the first convex curved surface and the first concave curved surface for the at least one of the first non-driving surfaces are continuous without a planar surface therebetween.

9. The planar ratchet assembly according to claim 1, wherein
the at least one of the first non-driving surfaces has a first tilt angle with respect to a plane perpendicular to the rotational axis that is greater than zero degrees and that is twenty-five degrees or less.

10. The planar ratchet assembly according to claim 9, wherein
the first tilt angle is twenty degrees or less.

11. The planar ratchet assembly according to claim 9, wherein
the first tilt angle is sixteen degrees or less.

12. The planar ratchet assembly according to claim 1, wherein
at least one of the first tooth tips includes a first flat surface.

13. The planar ratchet assembly according to claim 1, wherein
the first ratchet member further includes a first root surface between adjacent ones of the first serrated teeth.

14. The planar ratchet assembly according to claim 13, wherein
the second ratchet member further includes a second root surface between adjacent ones of the second serrated teeth, and
at least one of the first tooth tips is spaced from the second root surfaces where the first driving surfaces are engaged with the second driving surfaces.

15. The planar ratchet assembly according to claim 1, wherein
the first serrated teeth include an outer surface having an aluminum alloy.

16. The planar ratchet assembly according to claim 1, wherein
the second radius of curvature is at least 1.0 mm.

17. The planar ratchet assembly according to claim 16, wherein
the second radius of curvature is at least 1.5 mm.

18. The planar ratchet assembly according to claim 1, wherein
the at least one of the second non-driving surfaces further includes a second planar surface.

19. The planar ratchet assembly according to claim 1, wherein
the at least one of the second non-driving surfaces further includes a second concave curved surface.

20. The planar ratchet assembly according to claim 19, wherein
the second convex curved surface is located between the second tooth tip and the second concave curved surface of the at least one of the second non-driving surfaces.

21. The planar ratchet assembly according to claim 19, wherein
the at least one of the second non-driving surfaces further includes a second planar surface connecting the second convex curved surface and the second concave curved surface.

22. The planar ratchet assembly according to claim 19, wherein
the second convex curved surface and the second concave curved surface for the at least one of the second non-driving surfaces are continuous without a planar surface therebetween.

23. The planar ratchet assembly according to claim 1, wherein
the at least one of the second non-driving surfaces has a second tilt angle with respect to a plane perpendicular to the rotational axis that is greater than zero degrees and that is twenty-five degrees or less.

24. The planar ratchet assembly according to claim 23, wherein
the second tilt angle is twenty degrees or less.

25. The planar ratchet assembly according to claim 23, wherein
the second tilt angle is sixteen degrees or less.

26. The planar ratchet assembly according to claim 1, wherein
   at least one of the second tooth tips includes a second flat surface.

27. The planar ratchet assembly according to claim 1, wherein
   the second ratchet member further includes a second root surface between adjacent ones of the second serrated teeth.

28. The planar ratchet assembly according to claim 27, wherein
   the first ratchet member further includes a first root surface between adjacent ones of the first serrated teeth, and
   at least one of the second tooth tips is spaced from the first root surfaces where the first driving surfaces are engaged with the second driving surfaces.

29. The planar ratchet assembly according to claim 1, wherein
   the second serrated teeth include an outer surface having an aluminum alloy.

30. The planar ratchet assembly according to claim 1, wherein
   the first ratchet member has a total number of the first serrated teeth arranged in a first ring having a first outer ratchet diameter such that a first ratio of the total number of the first serrated teeth divided by the first outer ratchet diameter is 0.7 or more.

31. The planar ratchet assembly according to claim 30, wherein
   the first ratio is 1.5 or less.

32. A hub comprising the planar ratchet assembly of claim 1, the hub further comprising:
   a hub axle defining the rotational axis;
   a hub body rotatably disposed around the hub axle;
   a sprocket support rotatably coupled to the hub axle via the planar ratchet assembly to transmit a driving force from the sprocket support to the hub body while the sprocket support rotates in the driving direction.

* * * * *